(12) United States Patent
Tanaka et al.

(10) Patent No.: US 7,636,518 B2
(45) Date of Patent: Dec. 22, 2009

(54) DIGITAL CAMERA

(75) Inventors: Hiroshi Tanaka, Tokyo (JP); Seimei Ushiro, Saitama (JP); Yoshihiro Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 589 days.

(21) Appl. No.: 11/590,813

(22) Filed: Nov. 1, 2006

(65) Prior Publication Data

US 2007/0098385 A1 May 3, 2007

(30) Foreign Application Priority Data

Nov. 2, 2005 (JP) ............................. 2005-319648

(51) Int. Cl.
*G03B 17/00* (2006.01)
(52) U.S. Cl. .................. 396/56; 348/211.2; 348/211.14
(58) Field of Classification Search .................. 396/56, 396/57; 348/211.99, 211.1, 211.2, 211.14, 348/231.2, 231.7, 231.9
See application file for complete search history.

(56) References Cited

U.S. PATENT DOCUMENTS

| 5,005,039 | A | * | 4/1991 | Hamada et al. | ................ | 396/95 |
| 5,630,180 | A | * | 5/1997 | Kusaka | ........................ | 396/63 |
| 6,026,245 | A | * | 2/2000 | Fujii et al. | ..................... | 396/85 |
| 6,052,509 | A | | 4/2000 | Abe | | |
| 6,359,837 | B1 | * | 3/2002 | Tsukamoto | .................. | 368/10 |
| 2005/0212921 | A1 | * | 9/2005 | Horii | ..................... | 348/211.14 |
| 2006/0061663 | A1 | * | 3/2006 | Park | ........................ | 348/211.2 |
| 2007/0166027 | A1 | * | 7/2007 | Misawa | ...................... | 396/529 |

FOREIGN PATENT DOCUMENTS

| JP | 9-261519 A | 10/1997 |
| JP | 10-117302 A | 5/1998 |
| JP | 10-243277 A | 9/1998 |
| JP | 11-298770 A | 10/1999 |

\* cited by examiner

*Primary Examiner*—W B Perkey
*Assistant Examiner*—Noam Reisner
(74) *Attorney, Agent, or Firm*—Birch, Stewart, Kolasch & Birch, LLP

(57) ABSTRACT

A digital camera is composed of a camera body and a lens unit removebly attached to the camera body. When the lens unit is attached to the camera body, the lens unit and camera body send and receive control signals by antennas and wireless I/Fs each disposed on the lens unit and the camera body, respectively. In addition, data of the image captured with the lens unit is sent to the camera body by serial drivers, each disposed on the lens unit and the camera body, through connection contacts that electrically connect the lens unit and the camera body. When the lens unit is detached from the camera body, on the other hand, the control signals are sent and received by the antennas and the wireless I/Fs, and the image data is sent by the wireless communication.

12 Claims, 23 Drawing Sheets

FIG.7
Tag Information — 85a
- MANUFACTURE NAME : ○×Camera
- PRODUCT NAME : UltraShot-100
- VERSION : 1.00
- SHOOTING DATE : 2005/3/1_12:31:10
- ID : XXXXXXXXXX
⋮
Thumbnail Still Image (160×120) — 85b 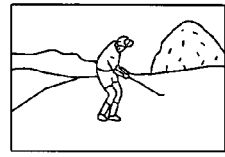
Main Still Image (2400×1800/1600×1200/1024×768/640×480 pixels) — 85c
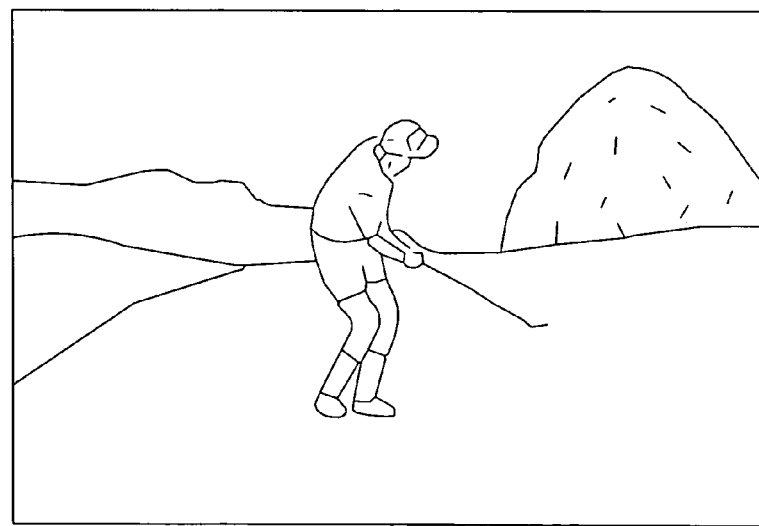

FIG.9
87
Tag Information
| MANUFACTURE NAME : ○×Camera |
| PRODUCT NAME : UltraShot-100 |
| VERSION : 1.00 |
| SHOOTING DATE : 2005/3/1_12:31:10 |
| ID : XXXXXXXXX |
⋮
— 87a
Thumbnail Still Image (160×120) 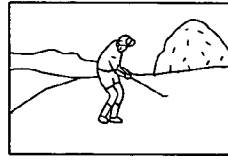 — 87b
Main Movie (1920×1080/640×480/320×240 pixels)
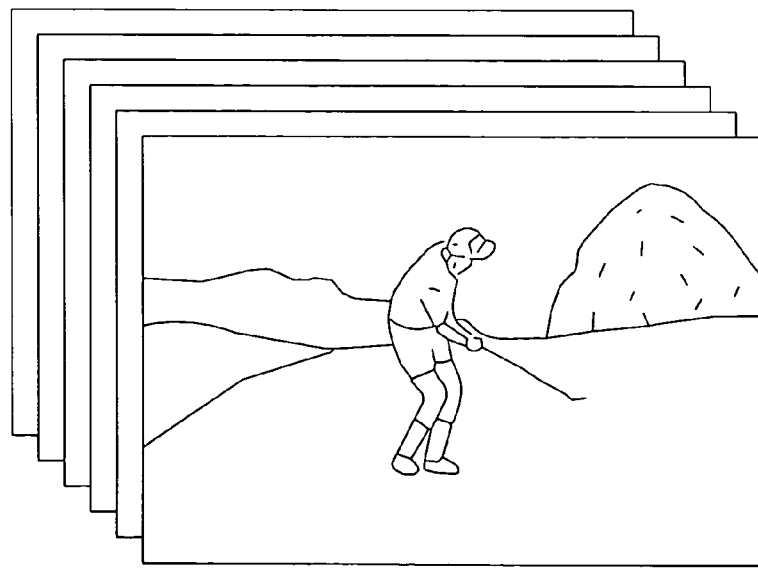
— 87c

DIGITAL CAMERA

BACKGROUND OF THE INVENTION

1. Field of the Invention

The present invention relates to a digital camera composed of a lens unit having a taking lens and a solid state imaging device, and a camera body to which the lens unit is removably attached.

2. Description Related to the Prior Art

Digital cameras are widely used, and include a solid state imaging device such as a CCD image sensor for capturing an image to store data of the image to a data storage. Digital cameras in which a lens unit having a taking lens and a solid state imaging device is removably attached to a camera body are also known.

Among such digital cameras, some allow both remote photographing and normal photographing. In the remote photographing, photographing is performed while the lens unit is detached from the camera body, and the data is exchanged wirelessly between the lens unit and the camera body. In the normal photographing, photographing is performed while the lens unit is attached to the camera body (for example, Japanese patent laid-open publication Nos. 10-117302, 10-243277 and 11-298770, and U.S. Pat. No. 6,052,509 corresponding to Japanese patent laid-open publication No. 9-261519).

The digital cameras disclosed in the above publications are composed of a lens unit having a solid state imaging device incorporated therein, and a camera body to which the lens unit is removably attached. The camera body processes and stores image data, and also displays the image. These digital cameras have a wireless communication device for sending and receiving data via radio waves between the lens unit and the camera body. The digital cameras are capable of the remote photographing by sending and receiving image data and control signals via radio waves. Since there is no restraint of a cable, such digital cameras are easier to handle than the digital cameras in which the lens unit and the camera body are connected through the cable.

In the digital cameras disclosed in the above publications, however, communication speed of the wireless communication is generally slower than that of wired communication. Therefore, the communication speed becomes insufficient when large volumes of image data are obtained by the lens unit per unit time, such as during high speed continuous shooting of still images or high definition movie shooting. There is another problem in that the data transmission has to be performed with extremely wideband frequency.

Moreover, the wireless communication has lower stability as compared to the wired communication. Therefore, when noise occurs during the transfer of movie data, the data transfer momentarily stops, and the movie data having defect may be recorded in a recording medium of the camera body.

The data communication can also be performed by wired communication through connection contacts such as mount portions or slots when the lens unit is attached to the camera body. Accordingly, the disadvantage of slow communication speed can be improved by switching to the wired communication when the lens unit is attached to the camera body. However, such solution of merely switching the communication system brings another problem that the wireless communication device is wasted when the lens unit is attached to the camera body.

SUMMARY OF THE INVENTION

An object of the present invention is to provide a digital camera capable of remote photographing and preventing insufficiency of communication speed, at a low cost.

In order to achieve the above and other objects, a digital camera of the present invention composed of a lens unit having a taking lens and a solid state imaging device, and a camera body to which the lens unit is removably attached includes a wireless communication device, a one-way communication device, a lens detector and a controller. The wireless communication device sends and receives data between the lens unit and the camera body via radio waves. The one-way communication device communicates data faster than the wireless communication device in one direction from the lens unit to the camera body when the lens unit is attached to the camera body. The lens detector detects attachment/detachment of the lens unit to/from the camera body. The controller controls the data communication. When the attachment of the lens unit to the camera body is detected by the lens detector, the controller controls the wireless communication device to send and receive control signals between the lens unit and the camera body via the radio waves. At the same time, the controller controls the one-way communication device to send image data obtained with the lens unit to the camera body. When the detachment of the lens unit from the camera body is detected by the lens detector, the controller controls the wireless communication device to send and receive the control signals between the lens unit and the camera body via the radio waves and to send the image data to the camera body via the radio waves.

The one-way communication device is preferably a high-speed serial communication device using Low-Voltage Differential Signaling for the one way communication through connection contacts which electrically connect the lens unit and the camera body when the lens unit is attached to the camera body. The one-way communication device may be a short range optical communication device.

When an image is captured with the lens unit attached to the camera body, the controller preferably controls the one-way communication device to send main image data with predetermined number of pixels to the camera body, and the main image data is stored in a first memory in the camera body. When an image is captured with the lens unit detached from the camera body, the controller stores the main image data in a second memory in the lens unit and controls the wireless communication device to send thumbnail image data with lower number of pixels than the main image data to the camera body, and the thumbnail image data is stored in the first memory.

Preferably, the lens unit includes a compression device for compressing the image data, and the camera body includes a comparing device for comparing a data rate necessary for sending the main image data to the camera body with an effective data transmission rate of the wireless communication device. The comparing device compares the data rate with the effective data transmission rate when the detachment of the lens unit from the camera body is detected by the lens detector. When the data rate is more than the effective data transmission rate, the thumbnail image data compressed by the compression device is preferably sent to the camera body via the radio waves. When the data rate is equal to or less than the effective data transmission rate, the main image data compressed by the compression device is preferably sent to the camera body via the radio waves.

When the data rate is more than the effective data transmission rate, it is preferable that a thumbnail image file including the thumbnail image data and link information to the main image data corresponding to the thumbnail image data is stored in the first memory of the camera body, and a main image file including the main image data and link information to the thumbnail image data corresponding to the main image data is stored in the second memory of the lens unit.

The thumbnail image file and the main image file preferably have an identical file name.

It is preferable that the camera body has a display device for displaying the main image data and the thumbnail image data on an identical screen.

The wireless communication device preferably sends at least one of the file name and a folder name of the thumbnail image file stored in the first memory to the lens unit. The main image file is preferably assigned with a file name or a folder name derived from the file name or the folder name sent from the first memory.

When the lens unit is attached to the camera body, it is preferable that the controller sends a command requesting the lens unit for the main image file corresponding to the thumbnail image file in a case where the thumbnail image file is stored in the first memory, and replaces the thumbnail image file by the main image file when receiving the main image file corresponding to the thumbnail image file from the lens unit in accordance with the command.

When the thumbnail image file stored in the first memory is a thumbnail movie file, it is preferable that thumbnail movie data included in the thumbnail movie file is added to a main movie file stored in the second memory before the thumbnail movie file is replaced by the main movie file.

When the attachment of the lens unit to the camera body is detected by the lens detector, the controller preferably controls the one-way communication device to send through image data obtained with the lens unit to the camera body. When the detachment of the lens unit from the camera body is detected by the lens detector, the controller preferably controls the compression device to compress the through image data and controls the wireless communication device to send the compressed through image data to the camera body.

According to the present invention, the wireless communication device is used only for sending and receiving the control signals, and the image data is sent by the one-way communication device when the lens unit is attached to the camera body. Owing to this, it is possible to make the best use of the wireless communication device and the one-way communication device. In addition, since the image data is sent by the one-way communication device, the communication speed is prevented from being insufficient. Moreover, since the one-way communication device is used only for sending the image data, the number of the connection contacts which electrically connect the lens unit and the camera body can be reduced, and therefore the production costs can be lowered.

The one-way communication device helps lowering the production costs as compared to a two-way communication device.

When an image is captured with the lens unit detached from the camera body, the main image data is stored in the second memory in the lens unit, and the thumbnail image data is sent to the camera body by the wireless communication device and stored in the first memory. Therefore the movie shooting or the high speed continuous shooting of still images can be performed regardless of the communication speed of the wireless communication device. Since the main image data is not sent to the camera body by the wireless communication device, an occurrence of noise on the main image data due to the lack of speed of the wireless communication can be prevented.

When an image is captured with the lens unit detached from the camera body, the main image data is not transferred, but the compressed thumbnail image data is transferred to the camera body in a case where the data rate is more than the effective data transmission rate. Owing to this, the communication speed of the control signals by the wireless communication device can be prevented from lowering, and therefore degradation in response time for each operation can be prevented.

The main image file is assigned with the file name or the folder name derived from the file name or the folder name of the thumbnail image file. Owing to this, it is easy to find the files which correspond to each other. When the main image file and the thumbnail image file have the identical file name, it becomes even easier to find the files corresponding to each other.

The thumbnail image data and the main image data are displayed on the identical screen, and therefore the images captured while the lens unit is detached from the camera body can be checked.

When the lens unit is attached to the camera body after an image is captured with the lens unit detached from the camera body, the thumbnail image file stored in the first memory is automatically replaced by the main image file stored in the second memory. Owing to this, it is prevented that the thumbnail and main image files are left stored in two different memories separately.

When the thumbnail image file is the thumbnail movie file, the thumbnail movie data included in the thumbnail movie file is added to the main movie file before the thumbnail movie file is replaced by the main movie file. Owing to this, the main movie file can be produced efficiently.

When the lens unit is detached from the camera body, the through image data is sent after being compressed, and therefore reducing burden on the wireless communication device. Accordingly, the communication speed of the control signals can be prevented from lowering.

BRIEF DESCRIPTION OF THE DRAWINGS

The above objects and advantages of the present invention will become more apparent from the following detailed description when read in connection with the accompanying drawings, in which:

FIG. 7 is an explanatory view illustrating a composition of a main still image file;

FIG. 9 is an explanatory view illustrating a composition of an incomplete main movie file;

DETAILED DESCRIPTION OF THE PREFERRED EMBODIMENTS

Figure 1:
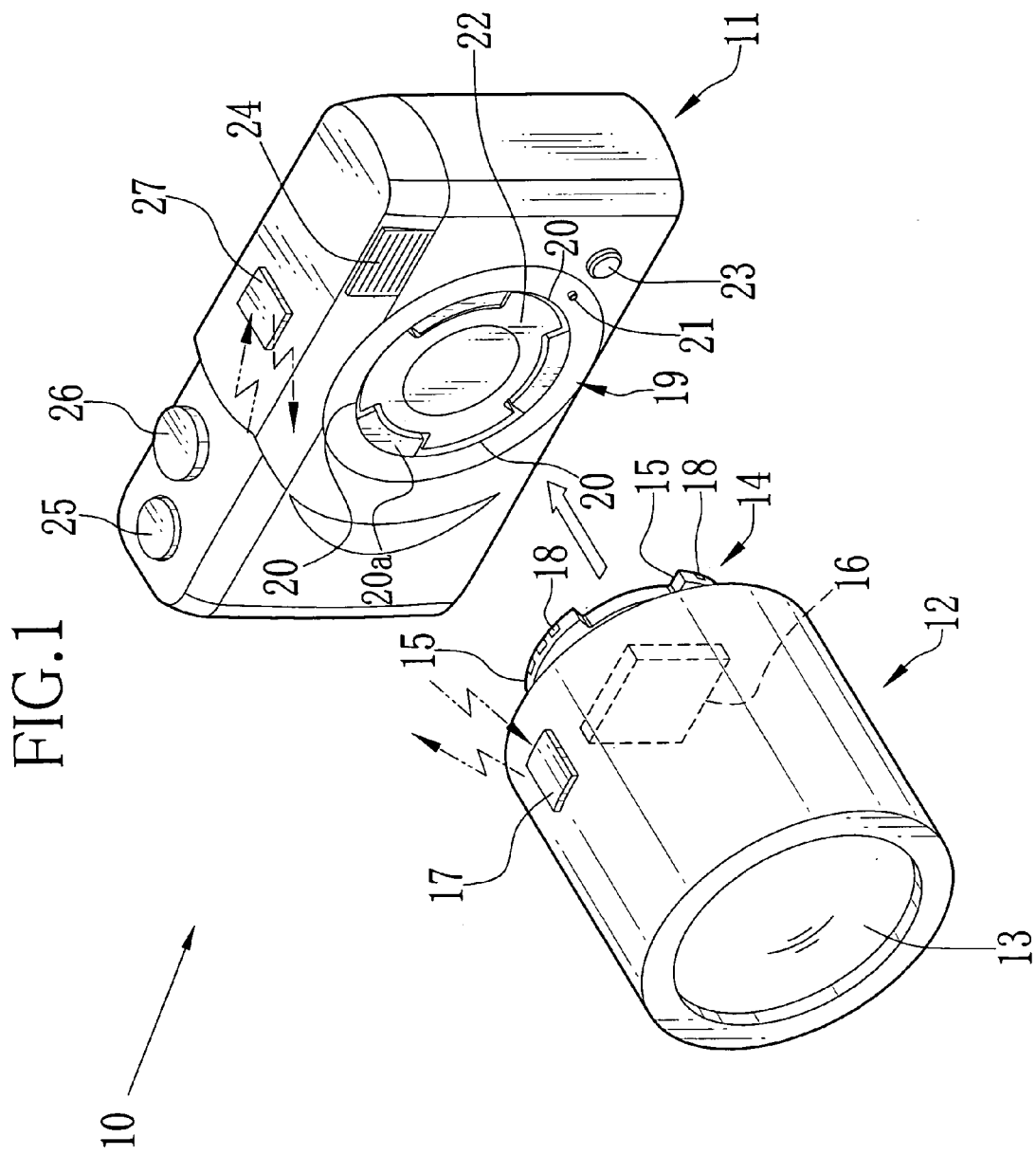
FIG. 1 is a perspective view illustrating a digital camera in which a lens unit is detached from a camera body according to a first embodiment of the present invention.

In FIG. 1, a digital camera 10 according to a first embodiment is explained. The digital camera 10 is composed of a camera body 11 and a lens unit 12. The lens unit 12 is removably attached to the camera body 11. The digital camera 10 is capable of normal photographing which is performed while the lens unit 12 is attached to the camera body 11 and remote photographing which is performed while the lens unit 12 is detached from the camera body 11.

At a front surface of the lens unit 12, a taking lens 13 is located. A lens side mount portion 14 is formed at a rear surface of the lens unit 12. The lens side mount portion 14 has three bayonet claws 15 arranged at regular intervals along an outer periphery of the lens side mount portion 14. Inside of the lens unit 12 is provided a CCD image sensor (hereinafter, CCD) 16 as a solid state imaging device for capturing a subject image focused by the taking lens 13.

An antenna 17 for sending and receiving data with the camera body 11 is disposed on an outer peripheral face of the lens unit 12. The lens side mount portion 14 is provided with a lens connection contact group 18. The lens connection contact group 18 is composed of, for example, twenty four connection contacts PL1 to PL24 (see FIG. 6). Each bayonet claw 15 has eight connection contacts. As the lens unit 12, several kinds of the lens units with different focal lengths of the taking lens 13 or with different numbers of pixels in the CCD 16, or those capable of monochrome photography, infrared photography or the like are prepared.

A camera side mount portion 19 is formed at a front surface of the camera body 11. The camera side mount portion 19 has three bayonet gaps 20 arranged at regular intervals along an outer periphery of the camera side mount portion 19. In order to attach the lens unit 12 to the camera body 11, the bayonet claws 15 are forced into the bayonet gaps 20, and the lens unit 12 is rotated in clockwise direction, thereby coupling the bayonet claws 15 with the bayonet claws 20a in a meshed manner.

When the lens unit 12 is attached to the camera body 11, the lens connection contact group 18 is electrically connected to a camera connection contact group 59 (see FIG. 5) provided on the camera side mount portion 19. As in the case of the lens connection contact group 18, the camera connection contact group 59 is composed of twenty four connection contacts PB1 to PB24 (see FIG. 6). Each of the connection contacts PB1 to PB24 is connected to each of the connection contacts PL1 to PL24 of the lens unit 12 when the lens unit 12 is attached to the camera body 11.

In addition, the camera side mount portion 19 is provided with a lock pin 21. When the lens unit 12 is attached to the camera body 11, the lock pin 21 becomes engaged with a pin hole (not shown) of the lens side mount portion 14, and rotation of the lens unit 12 is locked. Owing to this, the lens unit 12 is prevented from dropping off from the camera body 11.

A mount lid 22 is contained inside the camera side mount portion 19. The mount lid 22 is biased by a spring in a forward direction, so as to prevent dust or the like from entering to the camera body 11 while the lens unit 12 is not attached.

A lock release button 23 is located near the camera side mount portion 19. When the lock release button 23 is depressed while the lens unit 12 is attached to the camera body 11, the lock pin 21 is moved backwards and released from the engagement with the pin hole. When the lock release button 23 is depressed, and the lens unit 12 is rotated, the lens unit 12 is detached from the camera body 11.

A flash unit 24 is disposed on the upper front surface of the camera body 11. A shutter button 25, a mode selection dial 26 and an antenna 27 are disposed on an upper surface of the camera body 11. The shutter button 25 is depressed when an image is captured. The mode selection dial 26 is rotated to select a mode. The antenna 27 sends and receives data with the lens unit 12 via radio waves.

Figure 2:
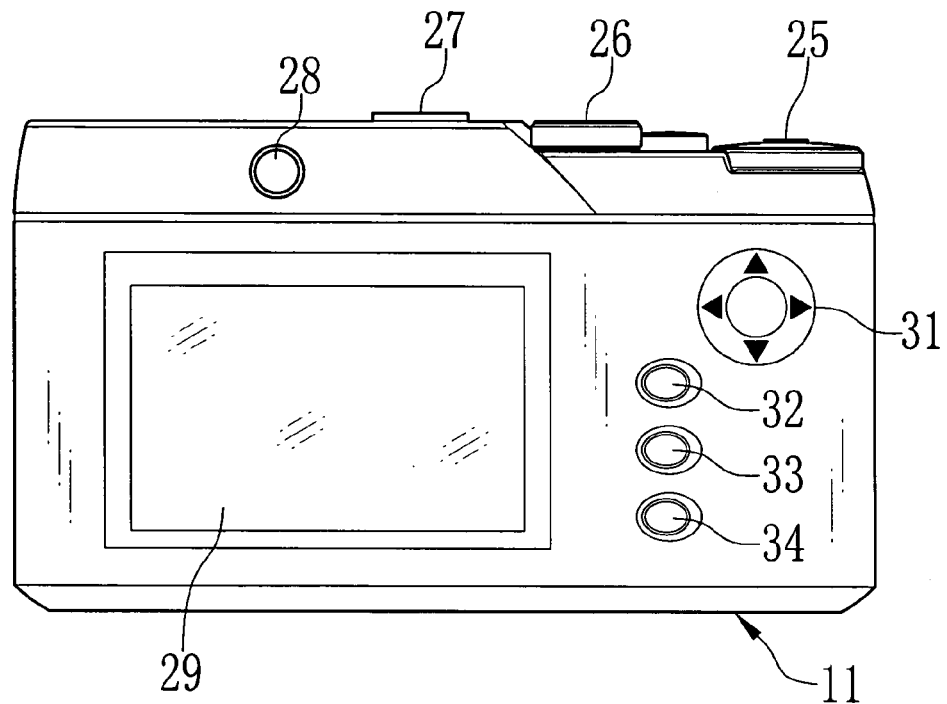
FIG. 2 is a rear view of the camera body.

As shown in FIG. 2, a power operation button 28, an LCD 29, a cursor operating button 31, a menu button 32, an execution button 33 and a cancel button 34 are disposed on a rear surface of the camera body 11. The LCD 29 displays images, various setup screens and the like.

Figure 3:
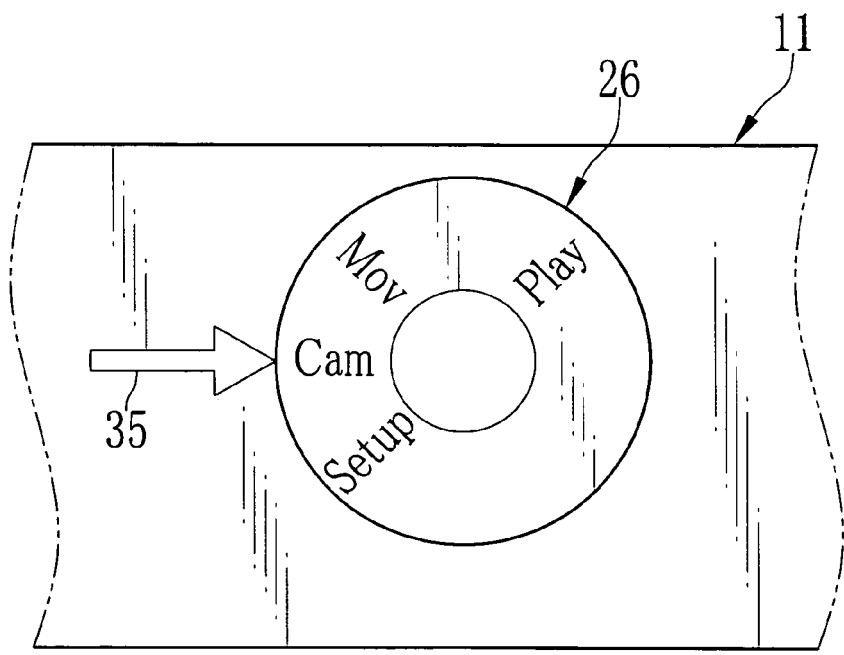
FIG. 3 is a plan view illustrating a mode selection dial.

The camera body 11 has a movie capture mode, a still image capture mode, a setup mode for making various settings, and a playback mode for reproducing recorded images. The mode selection dial 26 is rotated to select one of the modes. As shown in FIG. 3, for example, when a symbol "Cam" on the mode selection dial 26 is positioned to an arrow 35, the still image capture mode is selected. Similarly, "Mov"

selects the movie capture mode, "Setup" selects the setup mode and "Play" selects the playback mode.

Figure 4:
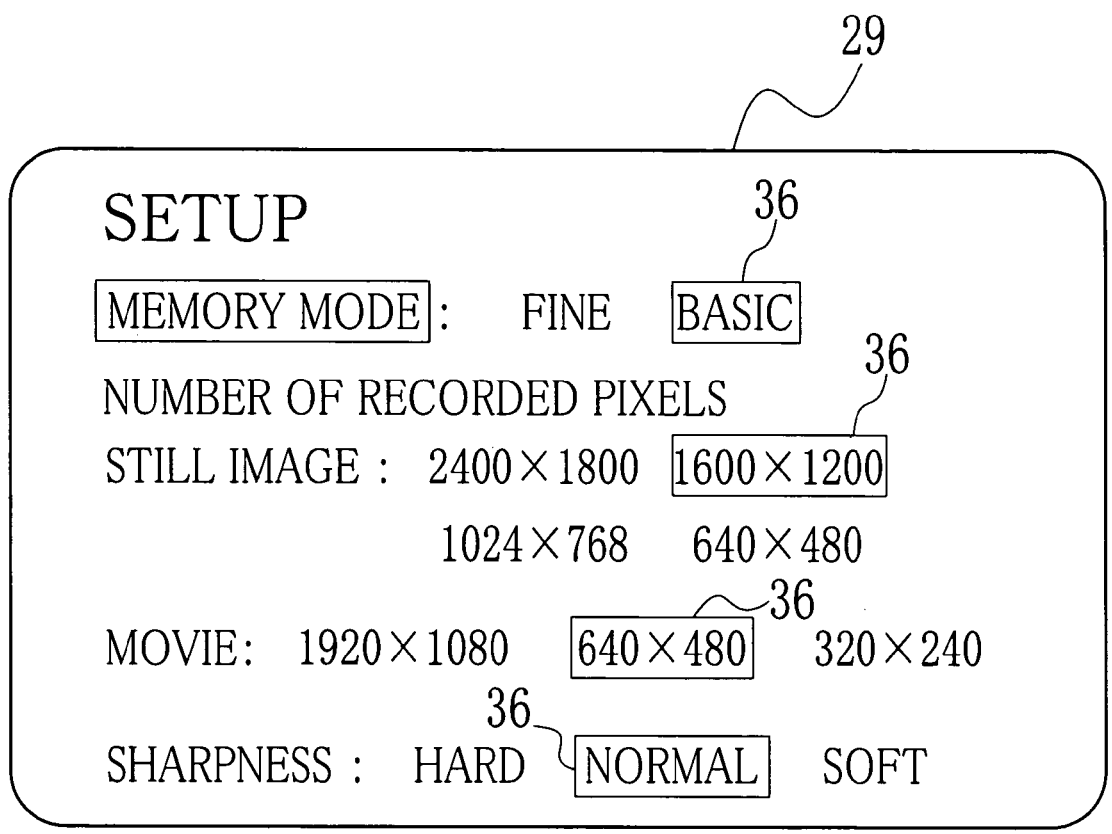
FIG. 4 is an explanatory view illustrating a setup screen.

When the setup mode is selected by rotating the mode selection dial 26 to "Setup" position, for example, a setup screen shown in FIG. 4 is displayed on the LCD 29. At this time, setting of a desired item can be modified by operating the operation buttons 31 to 34.

For example, in the item of "MEMORY MODE", either "FINE" or "BASIC" as to image quality (JPEG compression rate) is selected by placing a cursor 36 on one of them, and operating the execution button 33.

In the item of "NUMBER OF RECORDED PIXELS", one of "2400×1800", "1600×1200", "1024×768" and "640×480" is selected for "STILL IMAGE", and one of "1920×1080", "640×480" and "320×240" is selected for "MOVIE". In the item of "SHARPNESS", one of "HARD", "NORMAL" and "SOFT" is selected.

Figure 5:
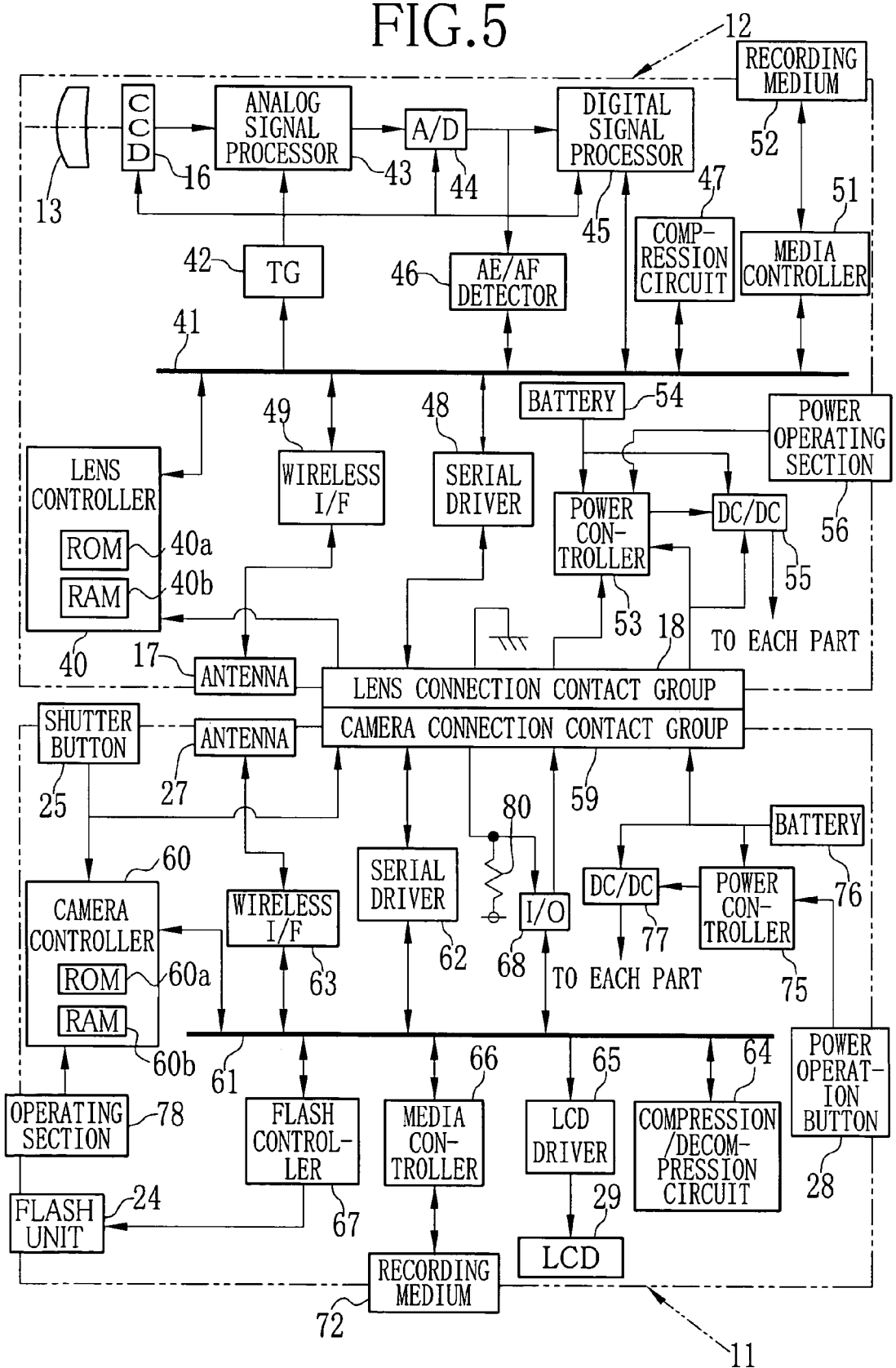
FIG. 5 is a block diagram illustrating an electrical structure of the digital camera according to the first embodiment.

As shown in FIG. 5, the lens unit 12 has a lens controller 40 for controlling each part of the lens unit 12. The lens controller 40 is provided with a ROM 40a and a RAM 40b. The ROM 40a stores a program for controlling each part of the lens unit 12. The RAM 40b temporarily stores work data. The lens controller 40 controls each part of the lens unit 12 based on the program stored in the ROM 40a.

A timing generator (hereinafter, TG) 42 is connected to the lens controller 40 through a data bus 41. The CCD 16, an analog signal processor 43, an A/D converter 44 and a digital signal processor 45 are connected to the TG 42, and controlled by a timing signal generated by the TG 42.

The lens controller 40 controls the TG 42 to drive the CCD 16, the analog signal processor 43, the A/D converter 44 and the digital signal processor 45. The CCD 16 photoelectrically converts the subject image focused by the taking lens 13 into an electric signal and outputs it as an image signal.

The CCD 16 is connected to the analog signal processor 43 and outputs the image signal thereto. The analog signal processor 43 is connected to the A/D converter 44. The analog signal processor 43 removes noise from the image signal and/or amplifies the same, and outputs it to the A/D converter 44. The processed image signal is converted from an analog signal form into a digital signal form in the A/D converter 44 to be output as image data.

The A/D converter 44 is connected to the digital signal processor 45. The digital signal processor 45 applies various image processing such as offset correction, white balance (WB) correction, γ correction, YC conversion and the like to the image data obtained from the A/D converter 44, and converts the image data into a YC signal in an uncompressed state in real time.

When the lens unit 12 is attached to the camera body 11, the YC signal is transferred in real time to the camera body 11 by a serial driver 48 which is described later. When the lens unit 12 is detached from the camera body 11, on the other hand, it takes time to transfer the uncompressed YC signal by the wireless communication. Therefore, the YC signal is firstly compressed in a compression circuit 47 in the lens unit 12, and then transferred to the camera body 11. The digital signal processor 45 also has a function to produce thumbnail movie data by resizing main movie data, a function to produce thumbnail still image data by resizing main still image data, a function to produce through image data, and other functions. Note that such data may be produced in the compression circuit 47, as described later.

An AE/AF detector 46 is connected to the A/D converter 44, and the image data is input to it from the A/D converter 44. The AE/AF detector 46 is connected to the lens controller 40 through the data bus 41, and controlled by the lens controller 40. The AE/AF detector 46 detects an AE detection value and an AF detection value based on the image data. The AE detection value is a value at which most appropriate exposure is obtained. The AF detection value is a value at which highest integration value of high-frequency components in the image data is obtained. The AE and AF detection values obtained by the AE/AF detector 46 are input to the lens controller 40.

The lens controller 40 controls electric shutter speed of the CCD 16 based on the AE detection value, and moves a focus lens of the taking lens 13 to an in-focus position by controlling a motor (not shown) based on the AF detection value.

Besides the lens controller 40, the TG 42, the digital signal processor 45 and the AE/AF detector 46, the compression circuit 47, the serial driver 48, a wireless I/F 49 and a media controller 51 are connected to the data bus 41, and controlled by the lens controller 40.

The compression circuit 47 has a function to apply JPEG compression to the through image data or the thumbnail movie data, to which various image processing have been applied in the digital signal processor 45, so as to convert it into Motion JPEG format, a function to apply MPEG compression (MPEG-2, MPEG-4 compression and the like) to the main movie data when capturing a movie, and other functions. The compression format is not limited to the above, but may be, for example, H.264 and so forth.

The serial driver 48 is connected to the lens connection contact group 18. The serial driver 48 converts the image data of a parallel signal form into a serial signal form, and sends the image data to the camera body 11 through the lens connection contact group 18. Note that the serial driver 48 transfers the image data by Low-Voltage Differential Signaling (LVDS). The LVDS uses the difference in voltage between two wires, and transfers image data at high speed by serial transmission.

The wireless I/F 49 is connected to the antenna 17. Data such as control signals are converted into data for wireless transmission in the wireless I/F 49, and sent to the camera body 11 from the antenna 17. The antenna 17 also receives data such as the control signals sent from the camera body 11. Note that the wireless I/F 49 is a wireless LAN device (IEEE802.11b), and the antenna 17 sends and receives the data in the 2.4 GHz bandwidth.

The medial controller 51 stores the compressed image data in a recording medium 52 and reads out the image data stored in the recording medium 52. Note that the recording medium 52 is, for example, a memory card removably connected to the lens unit 12.

A power controller 53 is connected to the lens connection contact group 18. A battery 54 and a DC/DC converter 55 are connected to the power controller 53. The battery 54 is also connected to the DC/DC converter 55. The power controller 53 controls the DC/DC converter 55 to decrease the voltage supplied from the battery 54 to a predetermined value. Then, the decreased voltage is supplied to each part of the lens unit 12. The DC/DC converter 55 is connected to the lens connection contact group 18.

A power operating section 56 is connected to the power controller 53. The power controller 53 receives operation signals from the power operating section 56. When an ON-signal as the operation signal is input from the power operating section 56, the power controller 53 controls the DC/DC converter 55 to start supplying the electric power to each part of the lens unit 12.

The camera body 11 has a camera controller 60 for controlling each part of the camera body 11. The camera controller 60 is provided with a ROM 60a and a RAM 60b. The ROM 60a stores a program for controlling each part of the camera body 11. The RAM 60b temporarily stores work data. The camera controller 60 controls each part of the camera body 11 based on the program stored in the ROM 60a.

A serial driver 62, a wireless I/F 63, a compression/decompression circuit 64, an LCD driver 65, a media controller 66, a flash controller 67 and an I/O port 68 are connected to the camera controller 60 through a data bus 61, and controlled by the camera controller 60.

The serial driver 62 is connected to the camera connection contact group 59. The serial driver 62 receives the image data sent from the serial driver 48 in the lens unit 12 by the LVDS through the camera connection contact group 59, and converts the image data of the serial signal form into the parallel signal form.

The serial drivers 48 and 62 are high-speed serial communication devices which transfer image data obtained with the lens unit 12 to the camera body 11 in real time by use of two or four connection contacts of the connection contact groups 18 and 59, respectively in a parallel manner. The serial drivers 48 and 62 communicate data only in one way: from the lens unit 12 to the camera body 11. For this configuration, it is not necessary to provide the camera body 11 with an LVDS transmitter and the lens unit 12 with an LVDS receiver, and therefore the production costs of the digital camera 10 can be lowered. Moreover, power consumption can be also lowered as compared to the case where two-way LVDS communication by use of common signal lines is performed.

The wireless I/F 63 is connected to the antenna 27. The antenna 27 sends and receives the data such as the image data and the control signals with the lens unit 12. Note that a wireless communication device is composed of the antennas 17 and 27, and the wireless I/Fs 49 and 63. The data such as the control signals are converted into the data for wireless transmission in the wireless I/F 63, and sent to the lens unit 12 from the antenna 27. The antenna 27 also receives the data such as the image data and the control signals sent from the lens unit 12. Note that the wireless I/F 63 is the wireless LAN device (IEEE802.11b), and the antenna 27 sends and receives the data in the 2.4 GHz bandwidth.

The compression/decompression circuit 64 compresses the image data received from the lens unit 12. In addition, the compression/decompression circuit 64 decompresses image data recorded in a recording medium 72, which is described later, when the image data is reproduced. That is, the compression/decompression circuit 64 has a function to apply JPEG compression and decompression to the still image data, a function to apply JPEG compression and decompression to the through image data or the thumbnail movie data which is sent from the lens unit 12 in Motion JPEG format, and a function to apply MPEG compression and decompression to the main movie data when capturing a movie.

The through image data received from the lens unit 12 and the image data recorded in the recording medium 72 are input to the LCD driver 65, and displayed as the through image or the reproduced image on the LCD 29.

The media controller 66 receives image data from the lens unit 12 during the image capturing and records the image data in the recording medium 72 to sort out from the through image data. The media controller 66 also reads out the image data in the recording medium 72. As in the case of the recording medium 52, the recording medium 72 is the memory card removably connected to the camera body 11.

The flash controller 67 controls the flash unit 24 so as to emit flash light. The I/O port 68 sends and receives signals with the lens unit 12 through the camera connection contact group 59.

A power controller 75 is disposed in the camera body 11. A battery 76 and a DC/DC converter 77 are connected to the power controller 75. The battery 76 is also connected to the DC/DC converter 77. The power operation button 28 is connected to the power controller 75.

The power controller 75 is receives operation signals (ON/OFF signals) produced by the operation of the power operation button 28. When the ON-signal is input, the power controller 75 controls the DC/DC converter 77 to decrease the voltage of the battery 76 to a predetermined value. Then, the decreased voltage is supplied to each part of the camera body 11. The battery 76 is also connected to the camera connection contact group 59 and supplies the electric power to the lens unit 12.

The shutter button 25 and an operating section 78 are connected to the camera controller 60. The shutter button 25 outputs a shutter signal S1 when it is depressed halfway and outputs a shutter signal S2 when it is fully depressed. The operating section 78 is composed of the cursor operating button 31, the menu button 32, the execution button 33 and the cancel button 34, and outputs operation signals corresponding to each operation button.

The camera controller 60 receives the shutter signal S1 or S2, or other operation signal, and executes the process corresponding to each signal. The shutter button 25 is also connected to the camera connection contact group 59. When the lens unit 12 is connected to the camera body 11, the shutter signals S1 and S2 are directly sent to the lens controller 40 in the lens unit 12 through the camera connection contact group 59 and the lens connection contact group 18.

Hereinafter, a lens detector which detects attachment/detachment of the lens unit 12 to/from the camera body 11 is explained. As mentioned above, the lens connection contact group 18 of the lens unit 12 is composed of twenty four connection contacts PL1 to PL24, and the camera connection contact group 59 of the camera body 11 is composed of twenty four connection contacts PB1 to PB24. Each of the connection contacts PB1 to PB24 of the camera body 11 are connected to each of the connection contacts PL1 to PL24 of the lens unit 12 when the lens unit 12 is attached to the camera body 11. For example, the connection contact PL1 is connected to the connection contact PB1, and the connection contact PL24 is connected to the connection contact PB24.

Figure 6:
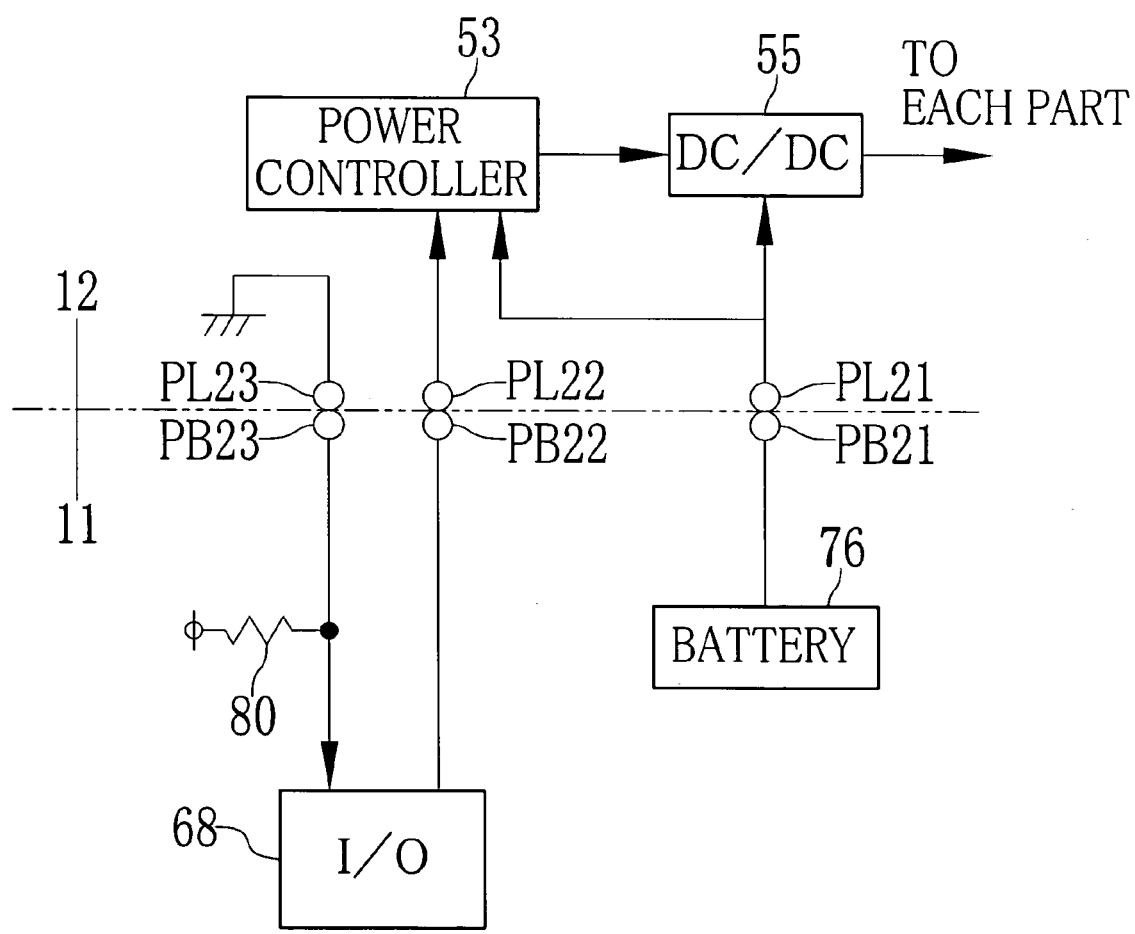
FIG. 6 is a block diagram illustrating a structure of a lens detector.

As shown in FIG. 6, for example, the connection contacts PB22 and PB23 are connected to the I/O port 68. A pull-up resister 80 is connected to the connection contact PB23. The power controller 53 of the lens unit 12 is connected to the connection contact PL22. The connection contact PL23 is grounded.

The lens detector which detects the attachment of the lens unit 12 to the camera body 11 is composed of the connection contacts PL23 and PB23, the pull-up resistor 80 and the I/O port 68. When the lens unit 12 is not attached to the camera body 11, an electric potential of the connection contact PB23 is increased to, for example, about 5 volts by the pull-up resister 80, and a High-signal is input to the I/O port 68. When the lens unit 12 is attached to the camera body 11, the connection contacts PB23 and PL23 are connected to each other. The connection contact PL23 is grounded, and therefore the electric potential of the connection contact PB23 becomes 0 volt. Accordingly, a Low-signal is input to the I/O port 68.

The camera controller 60 obtains the detection signals (Low-signal, High-signal) from the I/O port 68 and judges whether the lens unit 12 is attached to the camera body 11 or not based on the detection signal.

When the lens unit 12 is attached to the camera body 11, the I/O port 68 and the power controller 53 of the lens unit 12 are connected through the connection contacts PL22 and PB22. When the camera controller 60 recognizes the attachment of the lens unit 12 after the power operation button 28 is operated to start the power supply from the battery 76, the camera controller 60 outputs a power control signal to the power controller 53 of the lens unit 12 through the I/O port 68. Upon receiving this control signal, the power controller 53 starts supplying the electric power to each part of the lens unit 12 even without the input of the ON-signal from the power operating section 56, thereby automatically turning on the lens unit 12.

The battery 76 of the camera body 11 is connected to the connection contact PB21. The DC/DC converter 55 of the lens unit 12 is connected to the connection contact PL21. When the lens unit 12 is attached to the camera body 11, the power controller 53 and the DC/DC converter 55 are connected to the battery 76 through the connection contacts PL21 and PB21. Thus, the electric power can be supplied to the power controller 53 and the DC/DC converter 55 from the battery 76. Owing to this, each part of the lens unit 12 can be driven by the battery 76 even when the battery 54 is not mounted into the lens unit 12, or when the battery 54 does not have enough power.

In the present embodiment, the battery 54 has a smaller capacity than the battery 76. When the lens unit 12 is attached to the camera body 11, the lens unit 12 operates on the electric power supplied from the battery 76 of the camera body 11.

Next, a composition of a main still image file 85 stored in the recording medium 72 of the camera body 11 or the recording medium 52 of the lens unit 12 is explained. As shown in FIG. 7, the main still image file 85 is composed of Tag information 85a, thumbnail still image data 85b and main still image data 85c.

The Tag information 85a is composed of, for example, a manufacture name, product name, version of the digital camera being used, shooting date, ID which is individually assigned to the main still image data 85c, and the like. The ID may be, for example, 128-bit random numbers, or may be a combination of a serial number which is incremented after each shooting with a manufacture original code, product name code, product serial number and the like. The ID is produced by the lens controller 40 or the camera controller 60, and sent to the camera body 11 or the lens unit 12 to be stored as the Tag information for a main image file or a thumbnail image file.

The thumbnail still image data 85b is of 160×120 pixels and compressed in JPEG format. The main still image data 85c is also compressed in JPEG format.

The main still image file 85 is stored in the recording medium 52 of the lens unit 12 when the lens unit 12 is detached from the camera body 11 and the wireless communication speed is low with respect to the capacity of the main still image data 85c.

Figure 8:
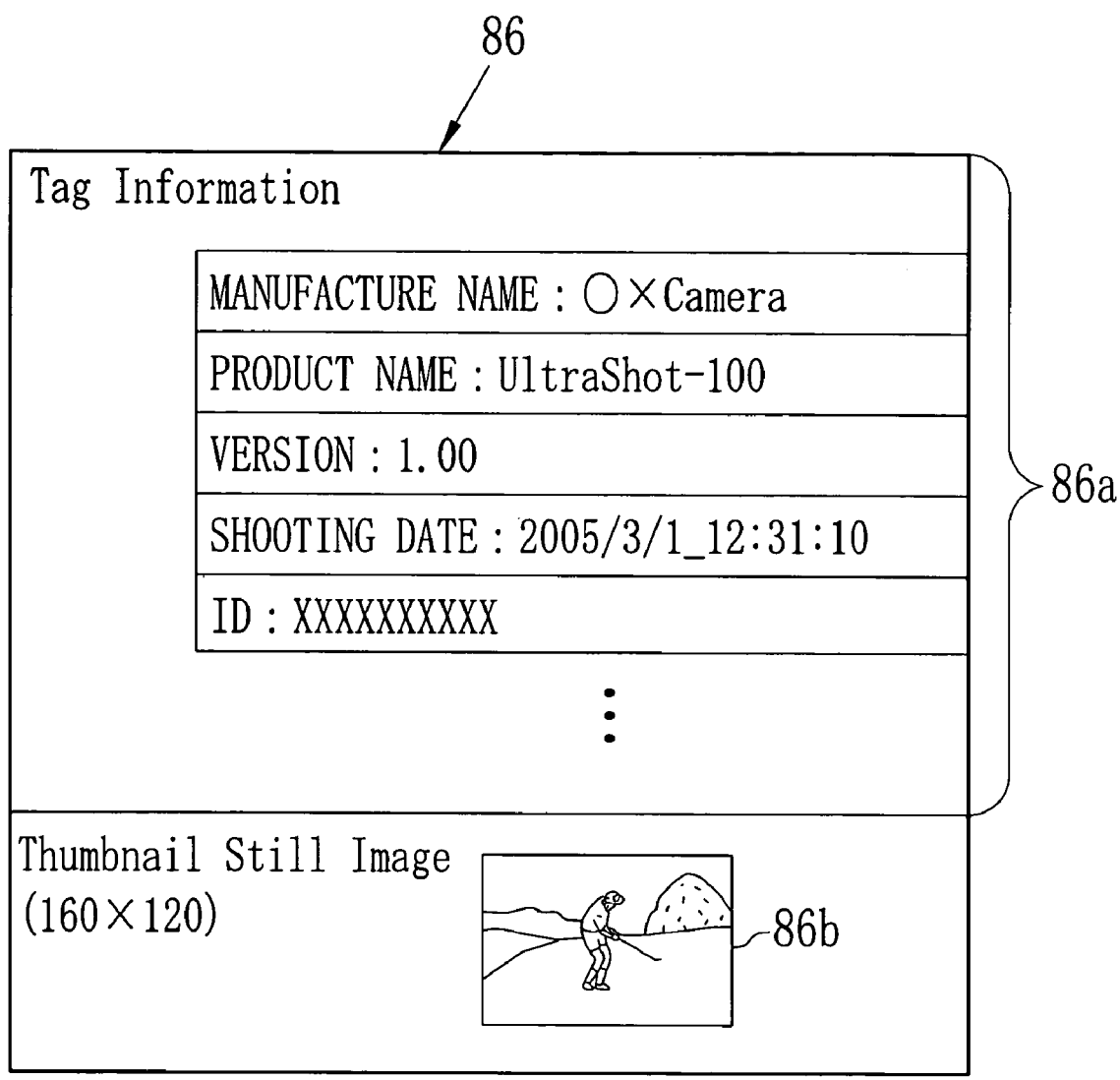
FIG. 8 is an explanatory view illustrating a composition of a thumbnail still image file.

Next, a composition of a thumbnail still image file 86 stored in the recording medium 72 of the camera body 11 is explained. As shown in FIG. 8, the thumbnail still image file 86 is composed of Tag information 86a and thumbnail still image data 86b. Unlike the main still image file 85, the thumbnail still image file 86 does not include main still image data.

The Tag information 86a has the same composition as the Tag information 85a. Like the thumbnail still image data 85b, the thumbnail still image data 86b is of 160×120 pixels and compressed in JPEG format.

The thumbnail still image file 86 is stored in the recording medium 72 of the camera body 11 when the lens unit 12 is detached from the camera body 11 and the wireless communication speed is low with respect to the capacity of the main still image data 85c.

Next, a composition of an incomplete main movie file 87 stored in the recording medium 52 of the lens unit 12 is explained. As shown in FIG. 9, the main movie file 87 is composed of Tag information 87a, thumbnail still image data 87b and main movie data 87c.

The Tag information 87a has the same composition as the Tag information 85a and 86a. The main movie file 87 is completed when thumbnail movie data is added thereto in the camera body 11. The incomplete main movie file 87 is stored in the recording medium 52 of the lens unit 12 when the lens unit 12 is detached from the camera body 11 and the wireless communication speed is low with respect to the capacity of the main movie data 87c.

Figure 10:
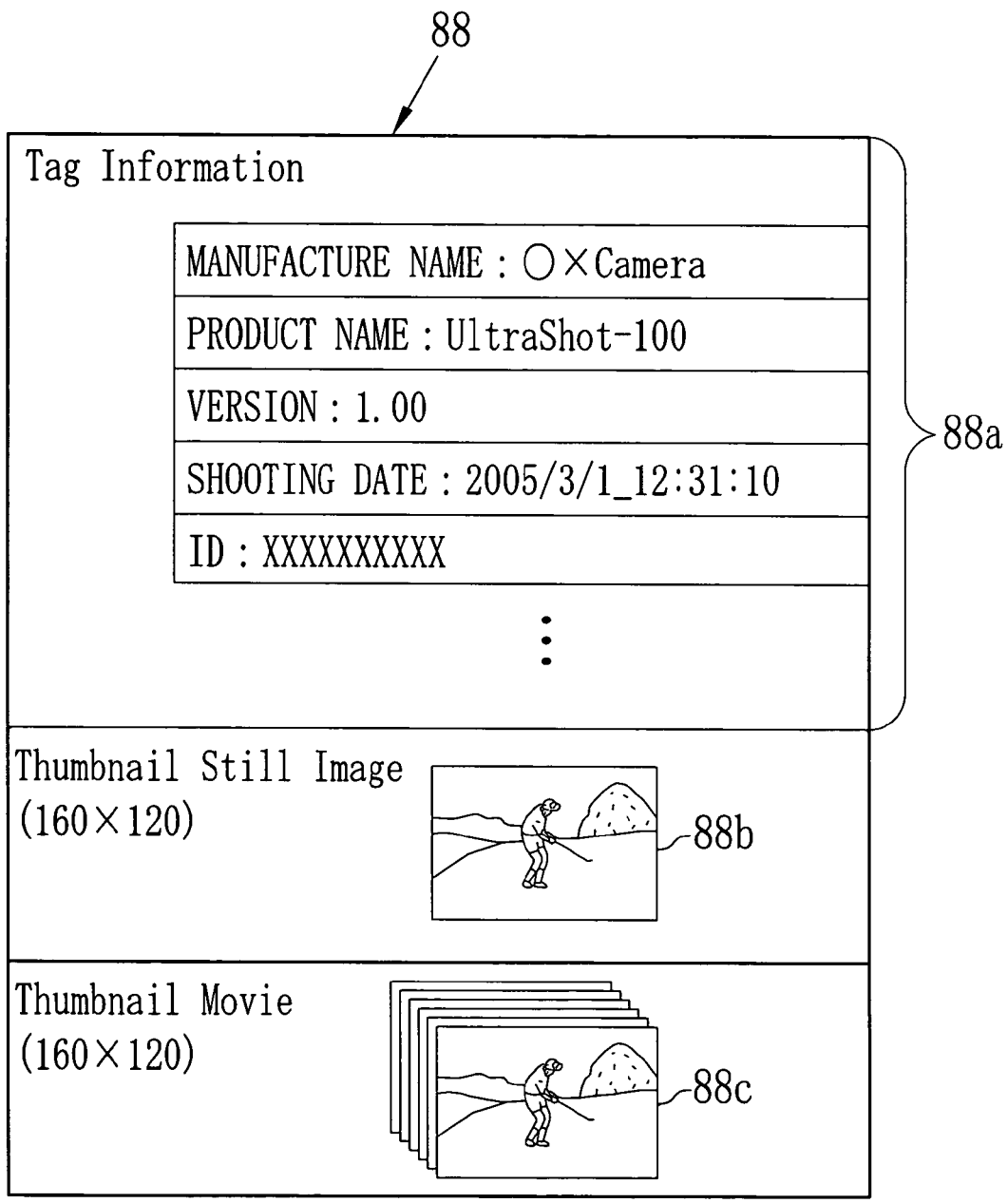
FIG. 10 is an explanatory view illustrating a composition of a thumbnail movie file.

Next, a composition of thumbnail movie file 88 stored in the recording medium 72 of the camera body 11 is explained. As shown in FIG. 10, the thumbnail movie file 88 is composed of Tag information 88a, thumbnail still image data 88b and thumbnail movie data 88c.

The Tag information 88a has the same composition as the Tag information 87a. The ID in the Tag information 88a corresponds to the thumbnail still image data 88b and the thumbnail movie data 88c as a link. The thumbnail still image data 88b is of 160×120 pixels and compressed in JPEG format. The thumbnail movie data 88c is of 160×120 pixels and compressed in Motion JPEG format. The thumbnail still image data 88b is shown with an initial frame of the thumbnail movie data 88c in the present embodiment. However, other peculiar frame may be extracted as the thumbnail still image data 88b.

The thumbnail movie file 88 is stored in the recording medium 72 of the camera body 11 when the lens unit 12 is detached from the camera body 11 and the wireless communication speed is low with respect to the capacity of the main movie data 87c.

As described above, when a movie is captured while the lens unit 12 is detached from the camera body 11, the incomplete main movie file 87 shown in FIG. 9 is stored in the recording medium 52 of the lens unit 12, and the thumbnail movie file 88 shown in FIG. 10 is stored in the recording medium 72 of the camera body 11. Thereafter, when the lens unit 12 is attached to the camera body 11, a synchronization process is performed, and a complete main movie file 89 is stored in the recording medium 72 of the camera body 11, as described later.

Figure 11:
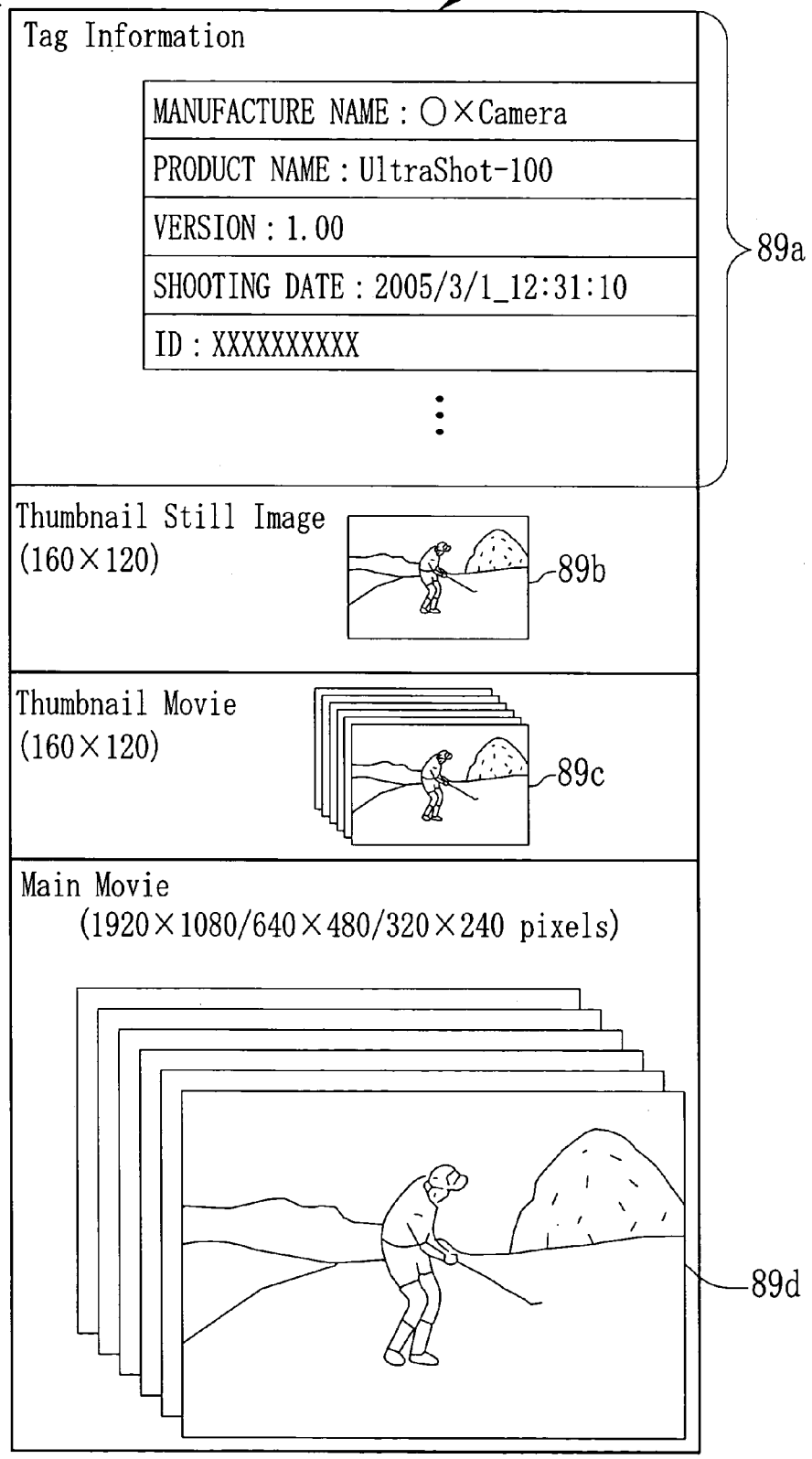
FIG. 11 is an explanatory view illustrating a composition of a complete main movie file.

As shown in FIG. 11, the main movie file 89 is composed of Tag information 89a, thumbnail still image data 89b (160×120 pixels/compressed in JPEG format), thumbnail movie data 89c (160×120 pixels/compressed in Motion JPEG format) and main movie data 89d (compressed in MPEG format). When a movie is captured while the lens unit 12 is attached to the camera body 11, the files 87 and 88 shown in FIGS. 9 and 10 respectively are not produced, but the main movie file 89 is directly produced and stored in the recording medium 72 of the camera body 11.

When a movie is captured while the lens unit 12 is detached from the camera body 11, the main movie file 89 takes over the same ID as the files 87 and 88 shown in FIGS. 9 and 10.

A data rate necessary for transferring the main image data to the camera body 11 by the remote photographing is explained. The data rate varies according to the number of pixels for movie, number of pixels for still image, and memory mode (only for still image capturing) as shown in Table 1 below. The selectable numbers of pixels are shown in FIG. 4. The data rates for the still image are the rates after the JPEG compression, and the data rates for the movie are the rates after the MPEG compression. Note that the values in parentheses indicate the volume of data which varies according to the number of pixels and the memory mode.

TABLE 1

| Number of pixels | Still image FINE | Still image NORMAL | Movie (30 fps) |
|---|---|---|---|
| 2400 × 1800 | 12.5 Mbps (2.5 MB) | 7.5 Mbps (1.5 MB) | — |
| 1920 × 1080 | — | — | 20 Mbps |
| 1600 × 1200 | 5 Mbps (1 MB) | 3.5 Mbps (700 KB) | — |
| 1024 × 768 | 2 Mbps (400 KB) | 1.25 Mbps (250 KB) | — |
| 640 × 480 | 750 Kbps (150 KB) | 500 Kbps (100 KB) | 6 Mbps |
| 320 × 240 | — | — | 2 Mbps |

The data rates shown in Table 1 are compared with effective data transmission rates of the wireless I/Fs 49 and 63. When the main image data can be sent, the main image data is transferred from the lens unit 12 to the camera body 11. When the main image data cannot be sent, thumbnail image data is produced and sent to the camera body 11 by the wireless communication.

The data rate necessary for transferring the main still image data is the speed for transferring the main still image data within 0.2 seconds. In the present embodiment, the CCD 16 is capable of reading out the data at the maximum speed of 0.2 seconds. In order to perform the high speed continuous shooting, the transfer of the main still image data has to be completed within 0.2 seconds, or otherwise the high speed continuous shooting performance is deteriorated.

Figure 12:
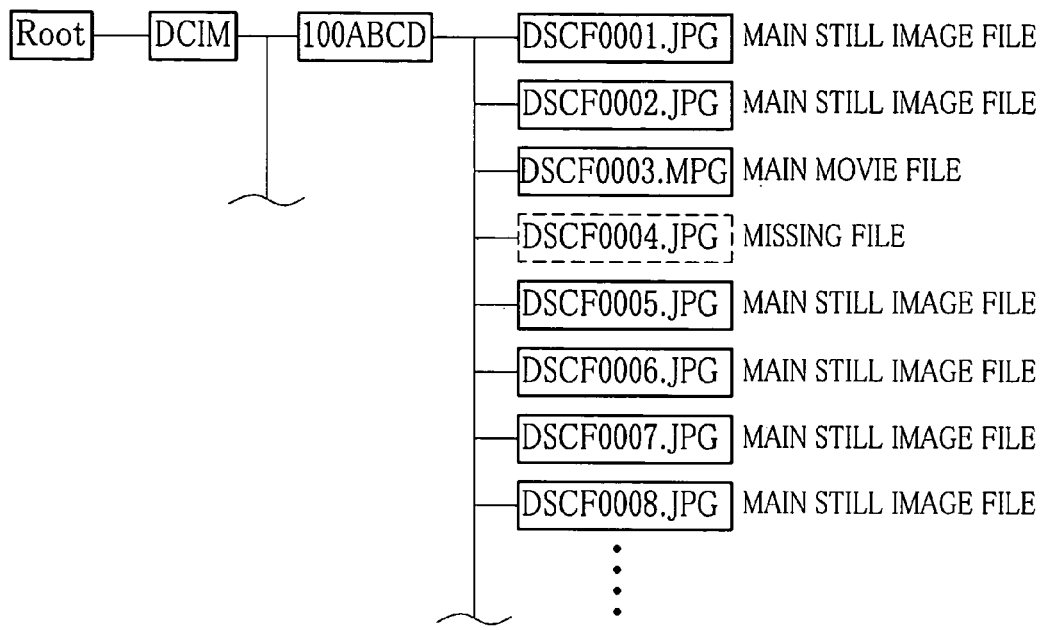
FIG. 12 is an explanatory view illustrating a memory structure of a recording medium in the camera body in which only main image files are stored.

Next, a memory structure of the recording medium 72 of the camera body 11 is explained. As shown in FIG. 12, in the recording medium 72 of the camera body 11, a folder "DCIM" is formed starting from a root directory "Root". In the folder "DCIM", a folder "100ABCD" is formed.

In the folder "100ABCD", only main still image files and main movie files are stored with serial file numbers (last four digits of the file name) assigned thereto. An extension for the main still image files is "JPG" and that for the main movie file is "MPEG".

Figure 13:
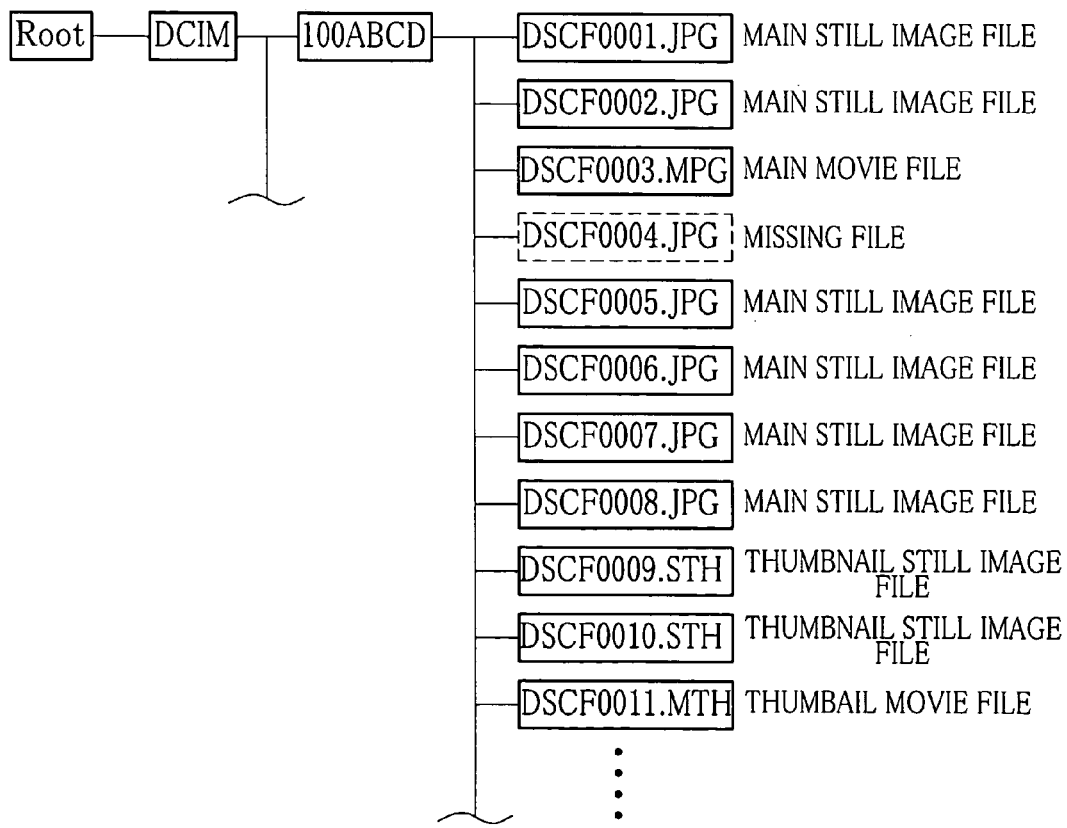
FIG. 13 is an explanatory view illustrating the memory structure of the recording medium in the camera body in which thumbnail image files are also stored after remote photographing.

When two frames of still images and one scene of a movie are captured while the recording medium 72 of the camera body 11 has the structure shown in FIG. 12, and the numbers of pixels (memory mode) for both the main still image data and the main movie data are set to those cannot be sent by the wireless communication, the recording medium 72 comes to have a structure shown in FIG. 13.

As shown in FIG. 13, two thumbnail still image files (DSCF009.STH and DSCF010.STH) and a thumbnail movie file (DSCF011.MTH) are stored with serial file names assigned thereto. At this time, an extension for the thumbnail still image files is "STH" and that for the thumbnail movie file is "MTH". Accordingly, it is easy to identify them from other main image files.

Figure 14:
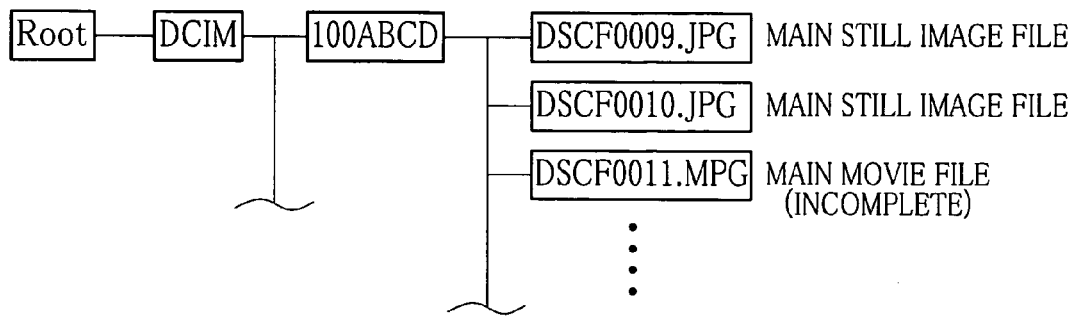
FIG. 14 is an explanatory view illustrating a memory structure of a recording medium in the lens unit.

When the recording medium 72 of the camera body 11 has the structure shown in FIG. 13, the recording medium 52 of the lens unit 12 comes to have a structure shown in FIG. 14. Two main still image files (DSCF009.JPEG and DSCF010.JPEG) corresponding to the two thumbnail still image files (DSCF009.STH and DSCF010.STH) in the recording medium 72, and an incomplete main movie file (DSCF011.MPG) corresponding to the thumbnail movie file (DSCF011.MTH) in the recording medium 72 are stored in the recording medium 52 with file names identical to the corresponding files.

Figure 15:
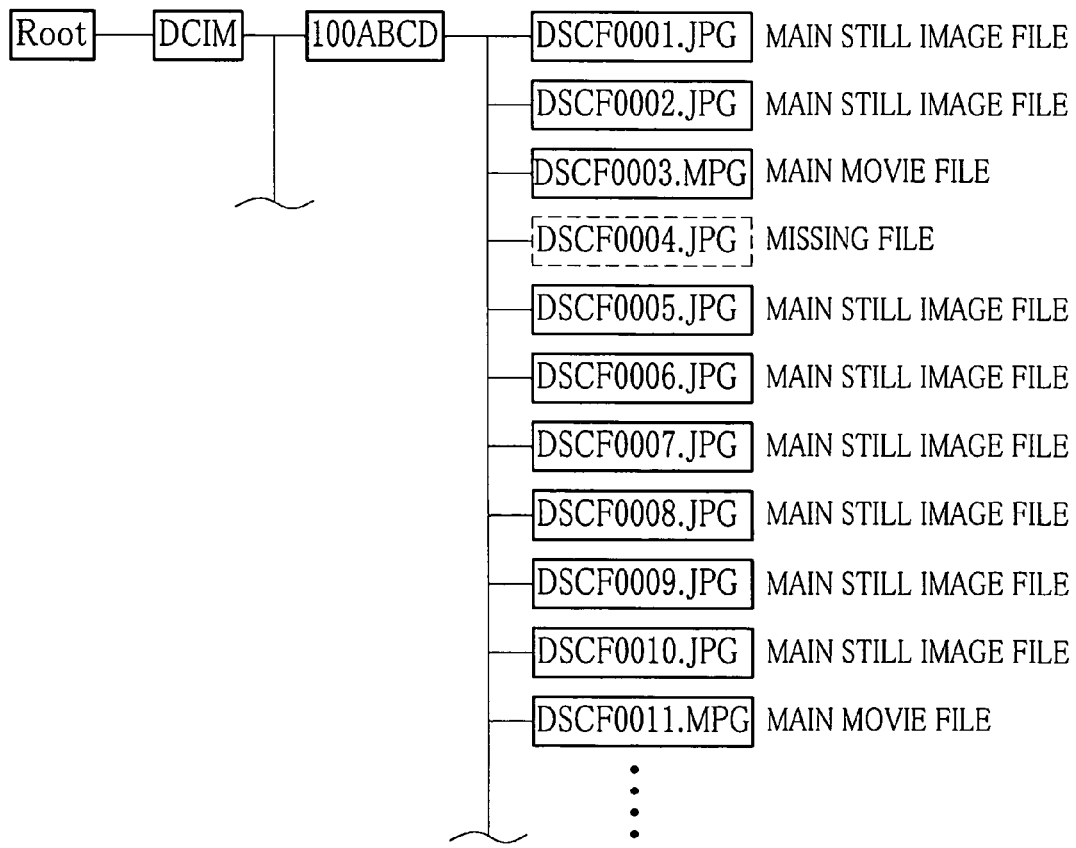
FIG. 15 is an explanatory view illustrating the memory structure of the recording medium in the camera body in which the thumbnail image files are replaced by main image files after a synchronization process.

When the lens unit 12 is attached to the camera body 11 while the recording medium 72 of the camera body 11 has the structure shown in FIG. 13, and the recording medium 52 of the lens unit 12 has the structure shown in FIG. 14, the synchronization process is performed as described later. When the synchronization process is performed, the two thumbnail still image files (DSCF009.STH and DSCF010.STH) and the thumbnail movie file (DSCF011.MTH) are replaced by the corresponding main image files (DSCF009.JPEG, DSCF010.JPEG, DSCF011.MPG) in the recording medium 72, as shown in FIG. 15.

Figure 16:
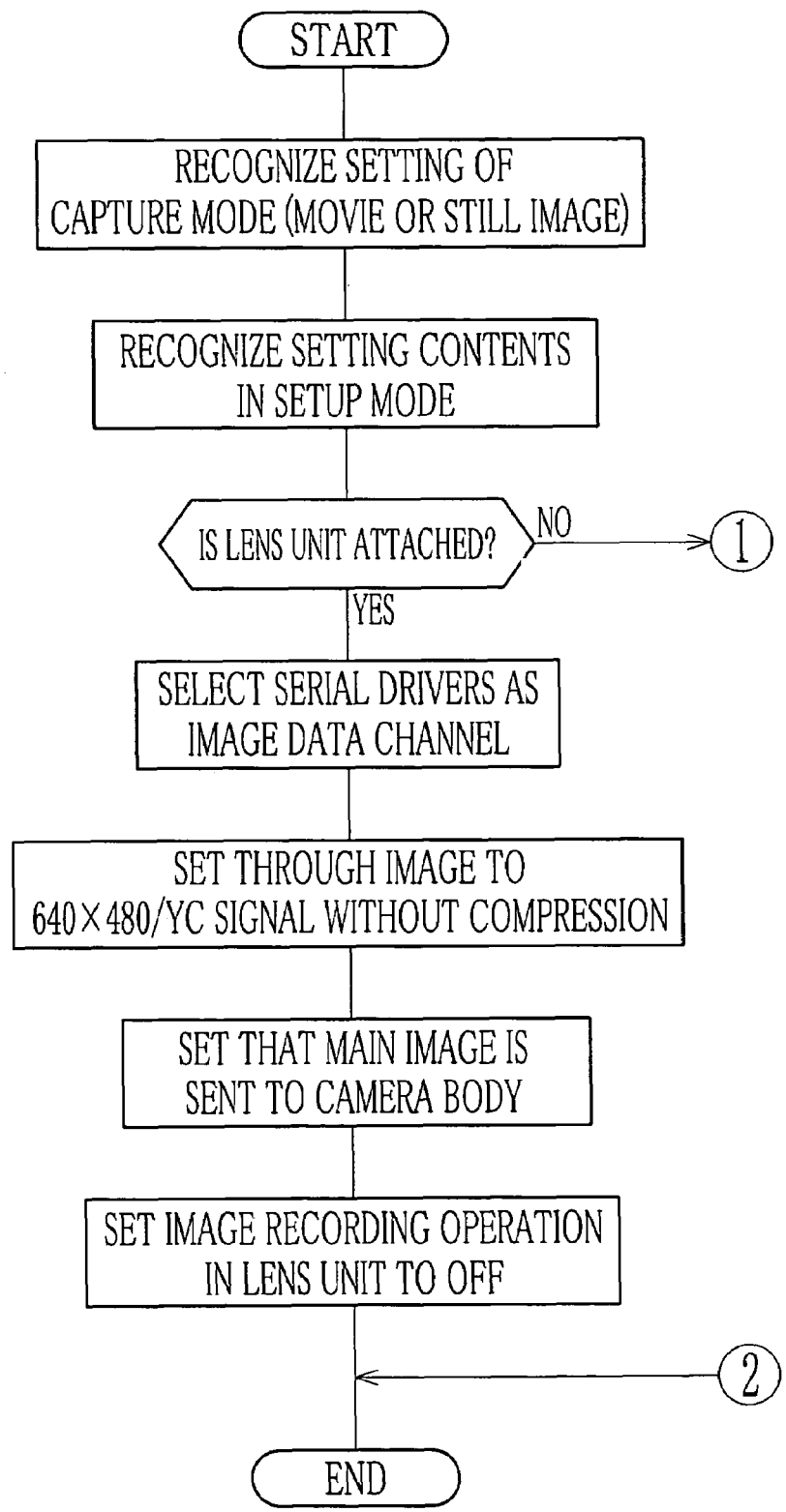
FIG. 16 is a flow chart explaining a production process of initialization information.
Figure 17:
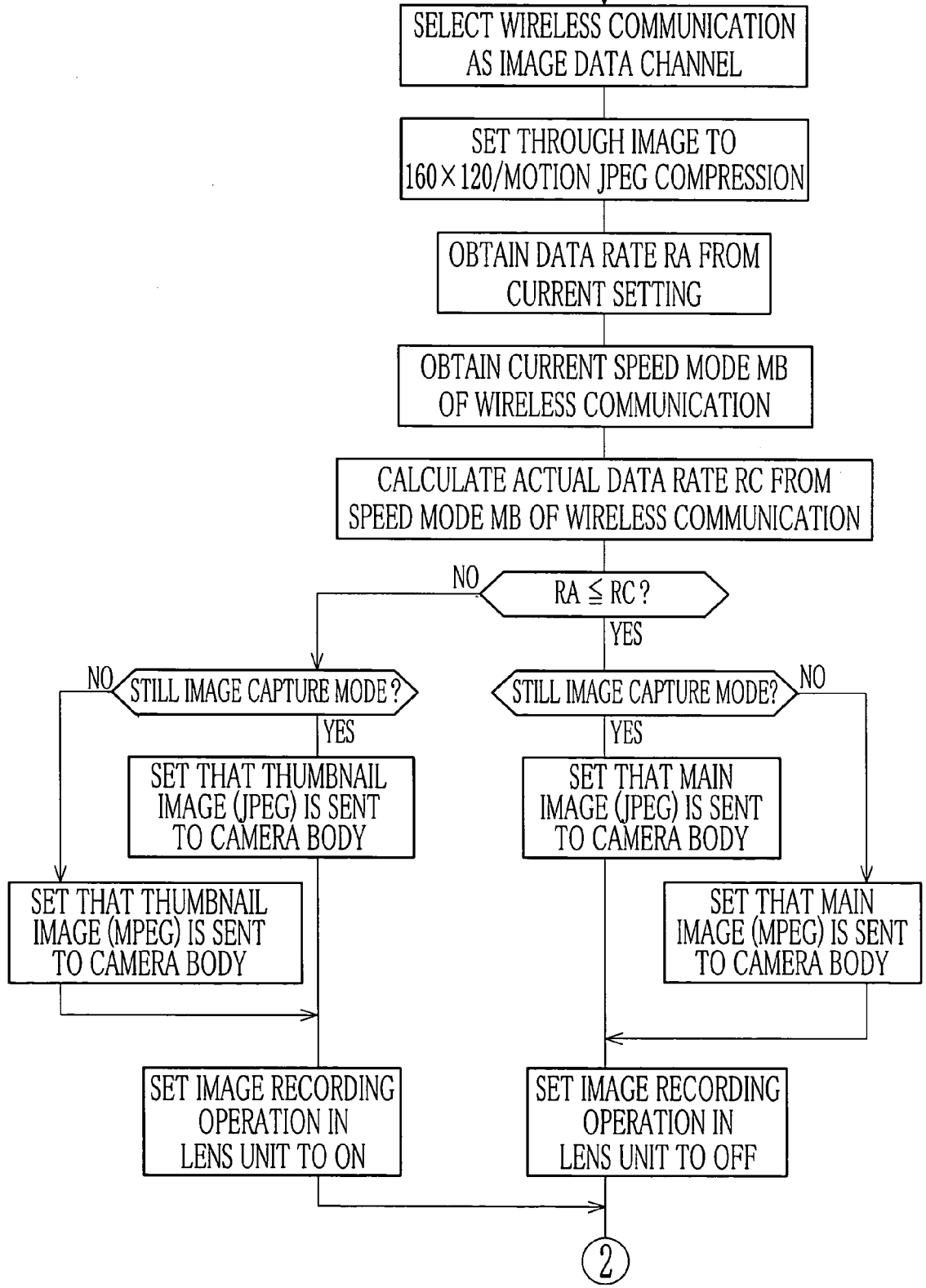
FIG. 17 is the flow chart continued from FIG. 16 explaining the production process of initialization information.

Next, an operation of the digital camera 10 is explained. First of all, a production process of initialization information is explained with referring to FIGS. 16 and 17. The process is to decide which is sent from the lens unit 12 to the camera body 11 between the main image data and the thumbnail image data, and to decide the number of pixels and the mode (YC signal without compression or Motion JPEG compression) of the through image sent from the lens unit 12 to the camera body 11.

The camera controller 60 recognizes as to which capture mode is selected between the movie capture mode and the still image capture mode. The camera controller 60 then recognizes setting contents in the SETUP mode.

Thereafter, the camera controller 60 judges whether the lens unit 12 is attached to the camera body 11 or not. When it is judged that the lens unit 12 is attached to the camera body 11, the camera controller 60 selects the serial drivers 48 and 62 as a communication channel for the image data from the lens unit 12 to the camera body 11.

The camera controller 60 sets the through image data to have the number of pixels of 640×480 and to be in YC signal form without compression (640×480/YC signal without compression). At the same time, the camera controller 60 sets that the main image data is transferred from the lens unit 12 to the camera body 11. Moreover, the camera controller 60 sets the image recording operation in the lens unit 12 to off and finishes the production process of initialization information.

When it is judged that the lens unit 12 is not attached to the camera body 11, the camera controller 60 selects the wireless communication (802.11b) as the communication channel for the image data from the lens unit 12 to the camera body 11.

The camera controller 60 sets the through image data to have the number of pixels of 160×120 and to be compressed in Motion JPEG format (160×120/Motion JPEG compression), and obtains a necessary data rate RA according to the current setting. The data rate RA is obtained from the Table 1 based on the image capture mode, the number of pixels and the memory mode.

Since communication speed of the wireless communication (802.11b) changes among 11 Mbps, 5.5 Mbps, 2 Mbps and 1 Mbps depending on the condition, the camera controller 60 obtains a current speed mode MB of the wireless communication.

The camera controller 60 calculates an actual data rate (effective data transmission rate) RC from the current speed mode MB (11/5.5/2/1 Mbps) of the wireless communication. The wireless I/Fs 49 and 63 send and receive the control signals as well as the image data. Therefore, the actual data rate RC (=MB/4) is calculated with a safety margin 4 times higher than the speed of the wireless communication, in order to assure the data rate shown in Table 1.

The camera controller 60 judges whether the data rate RA is equal to or less than the actual data rate RC. When the data rate RA is equal to or less than the data rate RC, the camera controller 60 judges as to whether the capture mode is set to the still image capture mode or not.

When it is judged that the still image capture mode is set, the camera controller 60 sets that the main image data (JPEG compression) is transferred to the camera body 11. Moreover, the camera controller 60 sets the image recording operation in the lens unit 12 to off and finishes the production process of initialization information.

When it is judged that the movie capture mode is set, the camera controller 60 sets that the main image data (MPEG compression) is transferred to the camera body 11. Similarly to the still image capture mode, the camera controller 60 sets the image recording operation in the lens unit 12 to off and finishes the production process of initialization information.

When the data rate RA is more than the data rate RC, the camera controller 60 judges as to whether the capture mode is set to the still image capture mode or not.

When it is judged that the still image capture mode is set, the camera controller 60 sets that the thumbnail image data (JPEG compression) is transferred to the camera body 11. Moreover, the camera controller 60 sets the image recording operation in the lens unit 12 to on and finishes the production process of initialization information.

When it is judged that the movie capture mode is set, the camera controller 60 sets that the thumbnail image data (MPEG compression) is transferred to the camera body 11. Moreover, the camera controller 60 sets the image recording operation in the lens unit 12 to on and finishes the production process of initialization information.

The initialization information is produced at the time of the initialization after the power being turned on, at the time of the attachment/detachment of the lens unit 12 to/from the camera body 11 in the image capture mode, at the time of changing the mode to the image capture mode from other modes, and the like.

Figure 18:
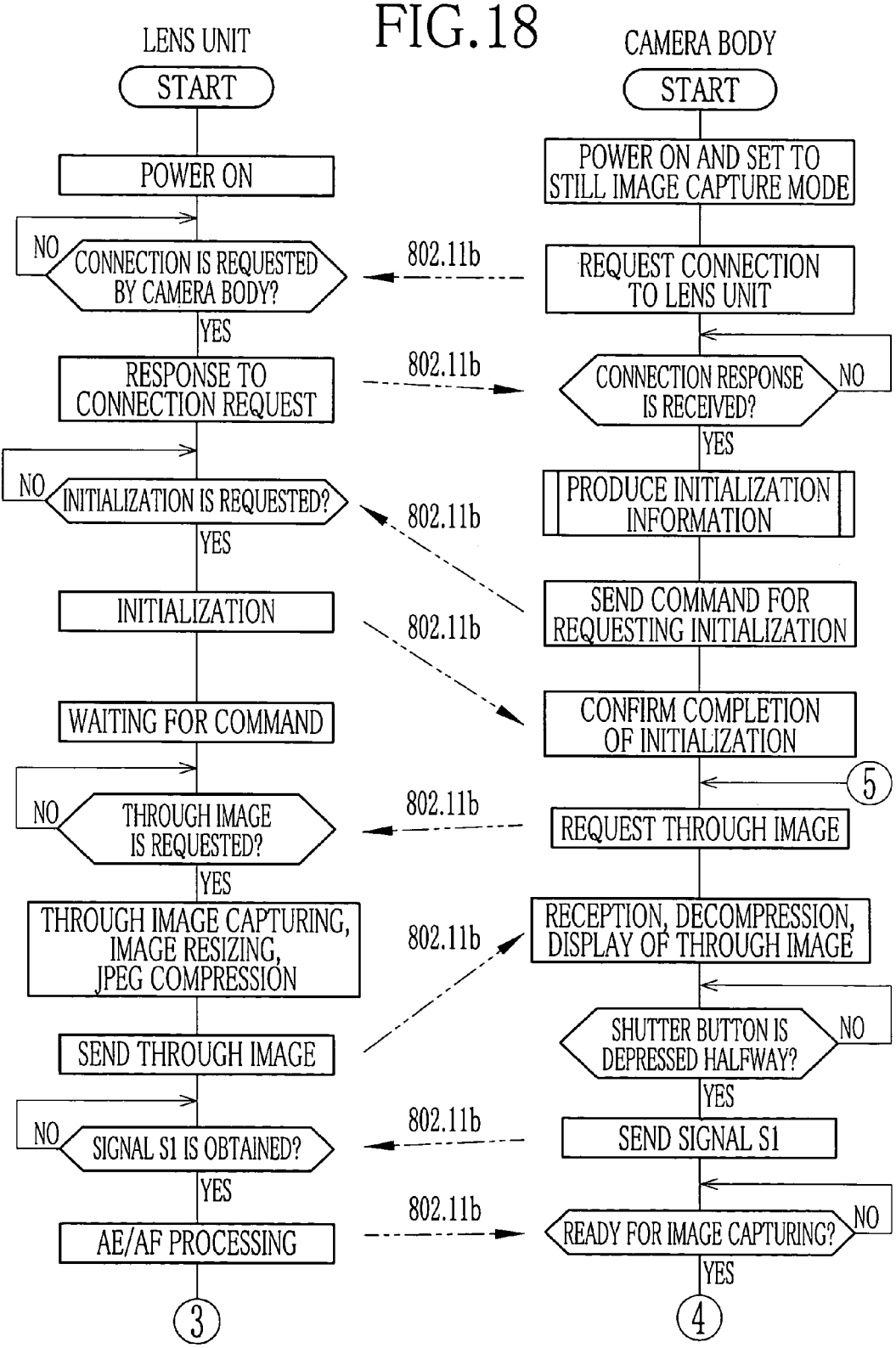
FIG. 18 is a flow chart explaining an image capturing process to store a main image file in the lens unit and a thumbnail image file in the camera body when a still image is captured by the remote photographing.
Figure 19:
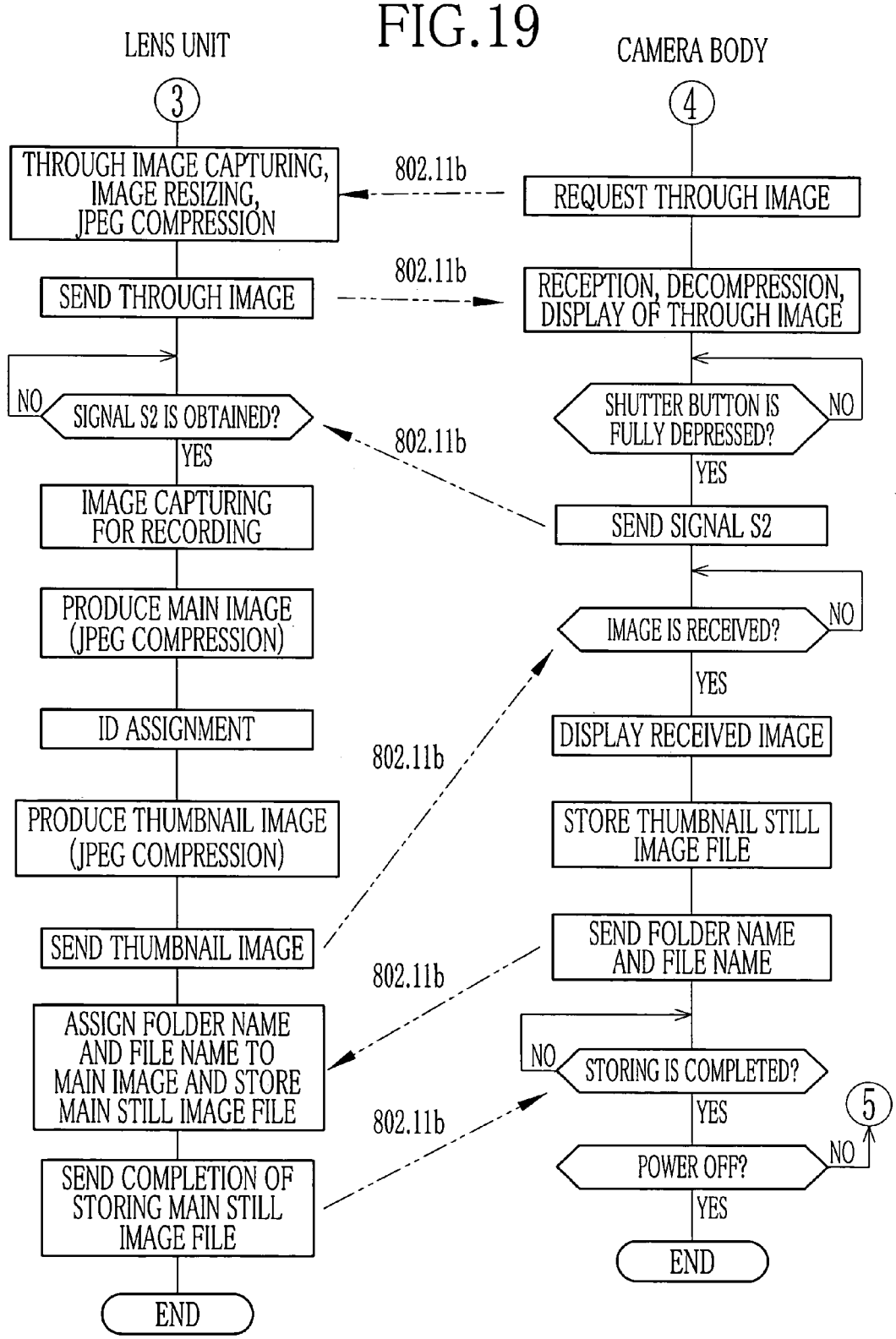
FIG. 19 is the flow chart continued from FIG. 18 explaining the image capturing process to store the main image file in the lens unit and the thumbnail image file in the camera body when the still image is captured by the remote photographing.

An image capturing process in the still image capture mode when the lens unit 12 is detached from the camera body 11 is explained with referring to a flow chart in FIGS. 18 and 19.

First of all, a process in the lens unit 12 is explained. When the lens unit 12 is turned on by the power operating section 56, the lens controller 40 judges whether connection is requested by the camera body 11 over the wireless communication (802.11b). When it is judged that the connection is not requested, the lens controller 40 stays in a standby state until the connection is requested.

When it is judged that the connection is requested by the camera body 11, the lens controller 40 sends a signal in response to the connection request to the camera body 11 over the wireless communication (802.11b). Thereafter, the lens controller 40 judges whether a command for requesting initialization is received or not. When it is judged that the initialization is not requested, the lens controller 40 stays in a standby state until the initialization is requested.

When it is judged that the initialization is requested from the camera body 11, the initialization is executed based on the command received from the camera body 11 over the wireless communication (802.11b). This command corresponds to the setting contents determined in the production process of initialization information.

After the initialization, the lens controller 40 sends a signal indicating the completion of the initialization to the camera body 11. The lens controller 40 gets in a state of waiting for a next command from the camera body 11, and then judges whether a through image is requested from the camera body 11 or not. When it is judged that the through image is not requested, the lens controller 40 stays in a standby state until the through image is requested.

When it is judged that the through image is requested from the camera body 11, the lens controller 40 controls each part of the lens unit 12 to perform image capturing by the CCD 16. The lens controller 40 also controls each part to apply resizing, various image processing, JPEG compression and the like to the image captured by the CCD 16. The lens controller 40 then sends this through image to the camera body 11 over the wireless communication (802.11b). The through image sent from the lens unit 12 to the camera body 11 is in Motion JPEG format in which each frame is compressed in JPEG format.

Thereafter, the lens controller 40 judges whether a shutter signal S1 is obtained or not. When it is judged that the shutter signal S1 is not obtained, the lens controller 40 stays in a standby state until the shutter signal S1 is obtained.

When it is judged that the shutter signal S1 is obtained, the lens controller 40 controls each part of the lens unit 12 based on the AE and AF detection values detected by the AE/AF detector 46 to perform AE/AF processing. When the processing is completed, the lens controller 40 sends a signal indicating the completion of the AE/AF processing to the camera body 11.

When receiving the request for a through image from the camera body 11, the lens controller 40 controls each part of the lens unit 12 to perform through image capturing by the CCD 16. The lens controller 40 also controls each part to apply resizing, various image processing, JPEG compression and the like to the image captured by the CCD 16. The lens controller 40 then sends the through image to the camera body 11 over the wireless communication (802.11b).

The lens controller 40 judges whether a shutter signal S2 is obtained or not. When it is judged that the shutter signal S2 is not obtained, the lens controller 40 stays in a standby state until the shutter signal S2 is obtained. When it is judged that the shutter signal S2 is obtained, on the other hand, the lens controller 40 controls each part of the lens unit 12 to perform image capturing for recording by the CCD 16. The lens controller 40 also controls each part to produce main image data by applying JPEG compression to the image captured by the CCD 16. Moreover, the lens controller 40 adds an ID, which is automatically produced, to this main image data.

In addition, the lens controller 40 controls each part of the lens unit 12 to produce thumbnail image data compressed in JPEG format, and assigns the ID to the thumbnail image data. The lens controller 40 then controls the wireless I/F 49 to send the thumbnail image data to the camera body 11 over the wireless communication (802.11b). Thereafter, a file name and a folder name of a thumbnail image file are sent from the camera body 11 over the wireless communication. These file name and folder name are assigned to the main image, and thereby producing the main still image file 85 shown in FIG. 7. The lens controller 40 controls the media controller 51 to store the main still image file 85 in the recording medium 52.

After the main still image file 85 is stored, the lens controller 40 controls the wireless I/F 49 to send a signal, which indicates completion of storing of the main still image file 85, to the camera body 11, and finishes the process of storing.

Next, a process in the camera body 11 is explained. When the still image capture mode is set after the camera body 11 is turned on by the power operation button 28, the camera controller 60 controls the wireless I/F 63 to send the connection request to the lens unit 12 over the wireless communication (802.11b).

The camera controller 60 then judges whether the connection response is received or not. When it is judged that the connection response is not received, the lens controller 60 stays in a standby state until the connection response is received. When it is judged that the connection response is received, the lens controller 60 executes the above described production process of initialization information.

The camera controller 60 controls the wireless I/F 63 to send the command for requesting initialization corresponding to the produced initialization information to the lens unit 12. The camera controller 60 confirms completion of the initialization when receiving the signal indicating the completion from the lens unit 12.

After confirming the completion of the initialization, the camera controller 60 controls the wireless I/F 63 to request a through image to the lens unit 12. The camera controller 60 then controls each part of the camera body 11 to receive the through image data. The camera controller 60 also controls each part to decompress the through image data and display the through image on the LCD 29.

Thereafter, the camera controller 60 judges whether the shutter button 25 is depressed halfway or not. When it is judged that the shutter button 25 is not depressed halfway, the camera controller 60 stays in a standby state until the shutter button 25 is depressed halfway.

When it is judged that the shutter button 25 is depressed halfway, the camera controller 60 controls the wireless I/F 63 to send the shutter signal S1 to the lens unit 12. The camera controller 60 then judges whether image capture preparation is completed or not. This judgment is made based on whether the signal indicating the completion of the AE/AF processing is obtained from the lens unit 12.

When it is judged that the image capture preparation is not completed, the camera controller 60 stays in a standby state until the preparation is completed. When it is judged that the image capture preparation is completed, the camera controller 60 controls the wireless I/F 63 to send the signal requesting a through image to the lens unit 12.

When the through image data is received, the camera controller 60 controls each part of the camera body 11 to decompress the through image data and display it on the LCD 29. Thereafter, the camera controller 60 judges whether the shutter button 25 is fully depressed or not. When the shutter button 25 is not fully depressed, the camera controller 60 stays in a standby state until the shutter button 25 is fully depressed.

When it is judged that the shutter button 25 is fully depressed, the camera controller 60 controls the wireless I/F 63 to send the shutter signal S2 to the lens unit 12. The camera controller 60 then judges whether the thumbnail image data is received or not. When it is judged that the thumbnail image data is not received, the camera controller 60 stays in a standby state until the thumbnail image data is received.

When it is judged that the thumbnail image data is received, the camera controller 60 controls the LCD driver 65 and displays the received image on the LCD 29. This thumbnail image data is assigned with the ID in the lens unit 12. The camera controller 60 gives a file name to the thumbnail image data, and thereby producing the thumbnail still image file 86 shown in FIG. 8. The camera controller 60 controls the media controller 66 to store the thumbnail still image file 86 in a predetermined folder in the recording medium 72.

Thereafter, the camera controller 60 controls the wireless I/F 63 to send the file name and the folder name of the thumbnail still image file 86 to the lens unit 12. The camera controller 60 then judges whether the storing of the main still image file 85 is completed or not. This judgment is made based on whether the signal indicating the completion of the storing is obtained from the lens unit 12.

When it is judged that the storing is not completed, the camera controller 60 stays in a standby state until the storing is completed. When it is judged that the storing is completed, the camera controller 60 judges whether the power of the camera body 11 is turned off or not.

When it is judged that the power of the camera body 11 is not turned off, the camera controller 60 goes back to the process of requesting the through image to the lens unit 12, the process right after the completion of the initialization. When it is judged that the power of the camera body 11 is turned off, the camera controller 60 finishes the process.

As described above, the file name of the thumbnail still image file 86 stored in the camera body 11 is sent to the lens unit 12, and the main still image file 85 stored in the lens unit 12 is assigned with the identical file name. Owing to this, it is possible to identify the correspondence between the thumbnail still image file 86 and the main still image file 85 only by checking their file names.

Figure 20:
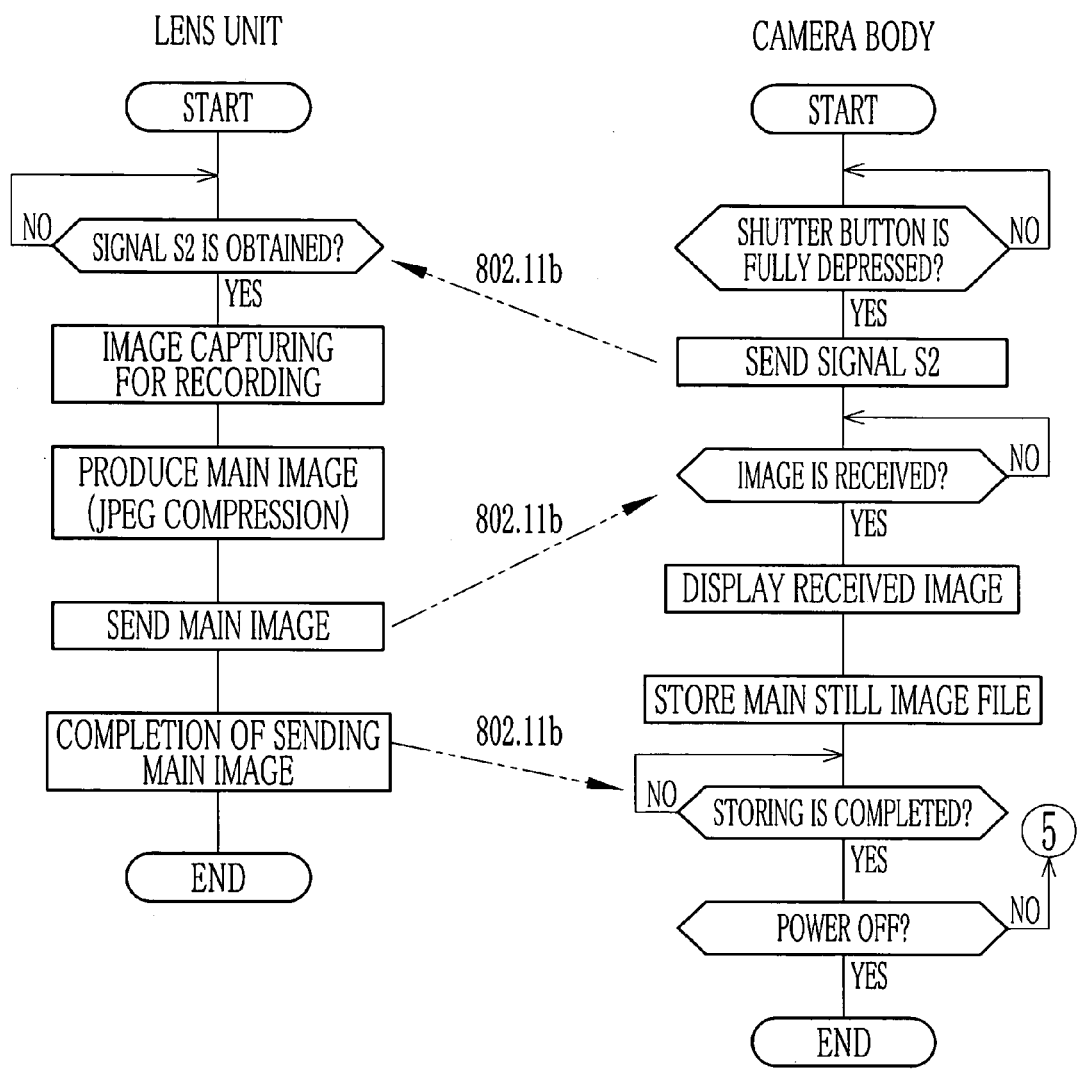
FIG. 20 is a flow chart explaining an image capturing process only to store the main image file in the camera body when a still image is captured by the remote photographing.

Next, an image capturing process in the still image capture mode when the lens unit 12 is detached from the camera body 11 is explained with referring to a flow chart in FIG. 20. At this time, the data rate RA necessary for sending the main image data is equal to or less than the actual data rate RC, and therefore the main image data can be transferred from the lens unit 12 to the camera body 11 right after the image capturing. Since the process until the shutter button 25 is fully depressed is the same as shown in the flow chart of the FIGS. 18 and 19, processes of the lens unit 12 and the camera body 11 after the shutter button 25 is fully depressed are only explained.

First of all, the process in the lens unit 12 is explained. The lens controller 40 judges whether a shutter signal S2 is obtained or not. When it is judged that the shutter signal S2 is not obtained, the lens controller 40 stays in a standby state until the shutter signal S2 is obtained. When it is judged that the shutter signal S2 is obtained, on the other hand, the lens controller 40 controls each part of the lens unit 12 to perform image capturing for recording by the CCD 16. The lens controller 40 also controls each part to produce main image data by applying JPEG compression to the image captured by the CCD 16.

Thereafter, the lens controller 40 controls the wireless I/F 49 to send the main image data to the camera body 11. When the transmission of the main image data is completed, the lens controller 40 controls the wireless I/F 49 to send a signal indicating the completion of sending of the main image data to the camera body 11.

Next, the process in the camera body 11 is explained. The camera controller 60 judges whether the shutter button 25 is fully depressed or not. When it is judged that the shutter button 25 is not fully depressed, the camera controller 60 stays in a standby state until the shutter button 25 is fully depressed.

When it is judged that the shutter button 25 is fully depressed, the camera controller 60 controls the wireless I/F 63 to send the shutter signal S2 to the lens unit 12. The camera controller 60 then judges whether the main image data is received or not. When it is judged that the main image data is not received, the camera controller 60 stays in a standby state until the main image data is received.

When it is judged that the main image data is received, the camera controller 60 controls each part of the camera body 11 to decompress the main image data and display it on the LCD 29. The camera controller 60 controls the media controller 66 to store the main still image file 85, which is the main image data with a file name, in the recording medium 72.

The camera controller 60 then judges whether the storing of the main still image file 85 is completed or not. This judgment is made based on whether the signal indicating the completion of the sending of the main image data is obtained from the lens unit 12.

When it is judged that the storing is not completed, the camera controller 60 stays in a standby state until the storing of the main still image file 85 is completed. When it is judged that the storing is completed, the camera controller 60 judges whether the power of the camera body 11 is turned off or not.

When it is judged that the power of the camera body 11 is not turned off, the camera controller 60 goes back to the process of requesting the through image to the lens unit 12, the process right after the completion of the initialization. When it is judged that the power of the camera body 11 is turned off, the camera controller 60 finishes the process.

As described above, through image data is sent from the lens unit 12 to the camera body 11 in the same manner as the flow chart shown in FIGS. 18 and 19. However, the image data is not stored in the recording medium 52 of the lens unit 12, and therefore the file name and the folder name need not be sent to the lens unit 12 by the wireless communication after the shutter button 25 is fully depressed.

Figure 21:
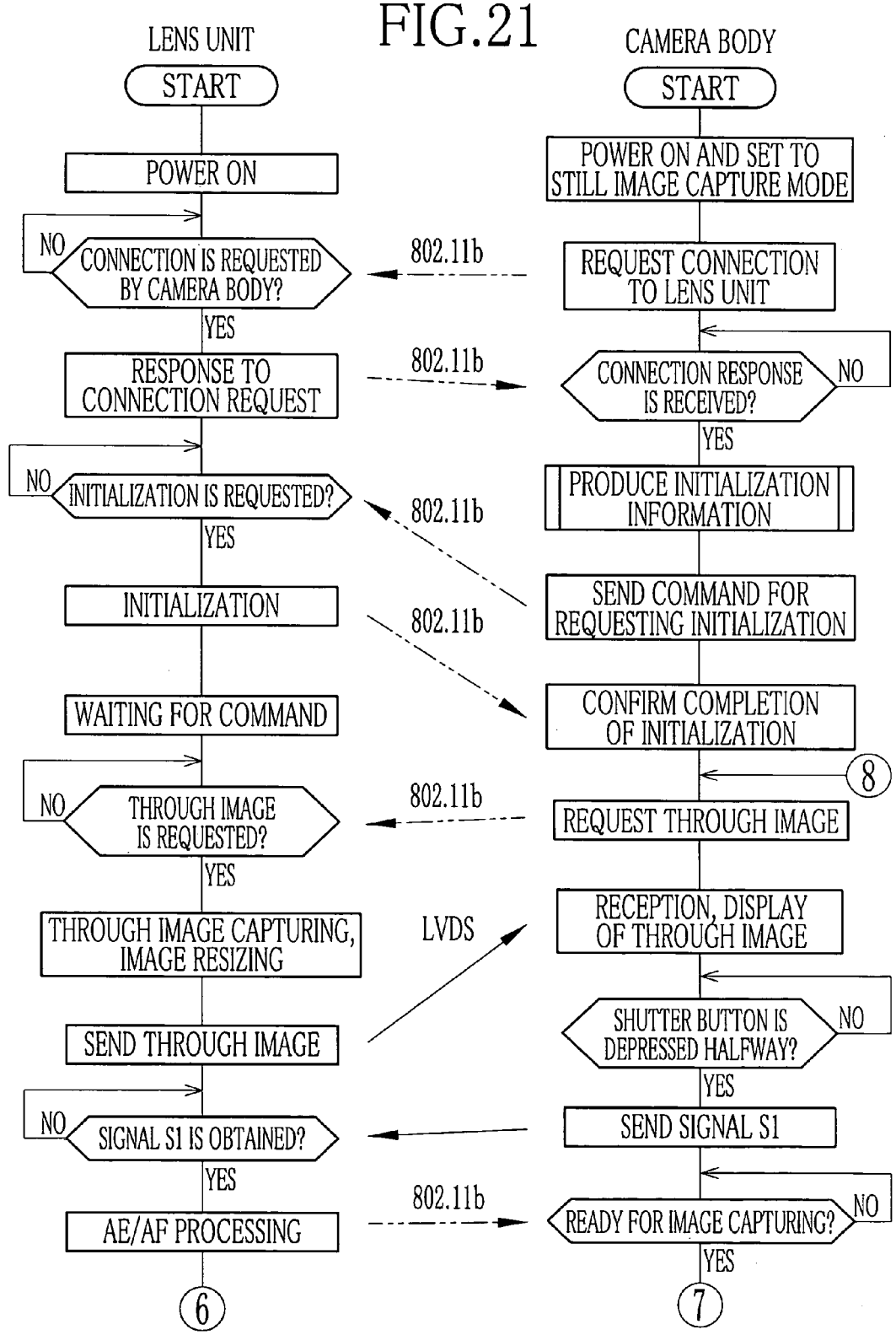
FIG. 21 is a flow chart explaining an image capturing process to store the main image file in the camera body when a still image is captured by normal photographing.
Figure 22:
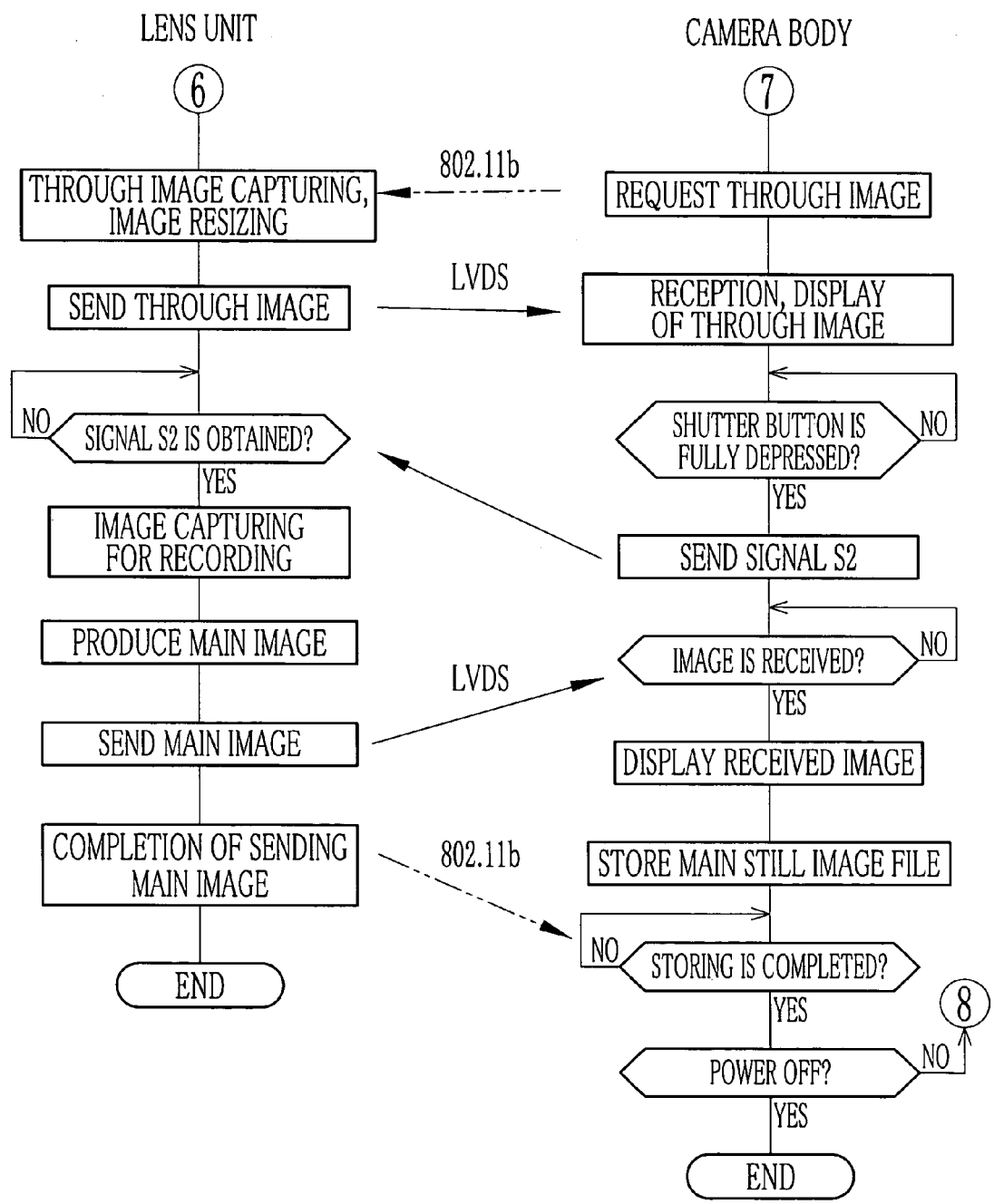
FIG. 22 is the flow chart continued from FIG. 21 explaining the image capturing process to store the main image file in the camera body when the still image is captured by the normal photographing.

Next, an image capturing process in the still image capture mode when the lens unit 12 is attached to the camera body 11 is explained with referring to a flow chart in FIGS. 21 and 22.

First of all, a process in the lens unit 12 is explained. The lens unit 12 is automatically turned on when the camera body 11 is turned on. The lens controller 40 judges whether connection is requested by the camera body 11 over the wireless communication (802.11b). When it is judged that the connection is not requested, the lens controller 40 stays in a standby state until the connection is requested.

When it is judged that the connection is requested by the camera body 11, the lens controller 40 sends a signal in response to the connection request to the camera body 11 over the wireless communication (802.11b). Thereafter, the lens controller 40 judges whether initialization is requested from the camera body 11 or not. When it is judged that the initialization is not requested, the lens controller 40 stays in a standby state until the initialization is requested.

When it is judged that the initialization is requested from the camera body 11, the initialization is executed based on the command received from the camera body 11. After the initialization, the lens controller 40 sends a signal indicating the completion of the initialization to the camera body 11. The lens controller 40 gets in a state of waiting for a next command from the camera body 11, and then judges whether a through image is requested from the camera body 11 or not. When it is judged that the through image is not requested, the lens controller 40 stays in a standby state until the through image is requested.

When it is judged that the through image is requested from the camera body 11, the lens controller 40 controls each part of the lens unit 12 to perform image capturing by the CCD 16. The lens controller 40 also controls each part to apply resizing, various image processing and the like to the image captured by the CCD 16. The lens controller 40 then sends the through image to the camera body 11 by the serial driver 48.

Then, the lens controller 40 judges whether a shutter signal S1 is obtained or not. This shutter signal S1 is directly sent from the camera body 11 to the lens controller 40 through a signal line used only for this purpose. When it is judged that the shutter signal S1 is not obtained, the lens controller 40 stays in a standby state until the shutter signal S1 is obtained.

When it is judged that the shutter signal S1 is obtained, the lens controller 40 controls each part of the lens unit 12 based on the AE and AF detection values detected by the AE/AF detector 46 to perform AE/AF processing. When the processing is completed, the lens controller 40 sends a signal indicating the completion of the AE/AF processing to the camera body 11 by the wireless communication (802.11b).

When receiving the request for a through image from the camera body 11, the lens controller 40 controls each part of the lens unit 12 to perform through image capturing by the CCD 16. The lens controller 40 also controls each part to apply resizing, various image processing and the like to the image captured by the CCD 16. The lens controller 40 then sends the through image data to the camera body 11 by the serial driver 48.

The lens controller 40 judges whether a shutter signal S2 is obtained or not. Similarly to the shutter signal S1, this shutter signal S2 is also directly sent from the camera body 11 to the lens controller 40 through the signal line used only for this purpose. When it is judged that the shutter signal S2 is not obtained, the lens controller 40 stays in a standby state until the shutter signal S2 is obtained.

When it is judged that the shutter signal S2 is obtained, the lens controller 40 controls each part of the lens unit 12 to perform image capturing for recording by the CCD 16. The lens controller 40 also controls each part to produce main image data (YC signal) by applying various image processing to the image captured by the CCD 16. The lens controller 40 sends the main image data (YC signal without compression) to the camera body 11 by the serial driver 48. When the transmission of the main image data is completed, the lens controller 40 sends a signal indicating the completion of sending of the main image data to the camera body 11 by the wireless communication (802.11b).

Next, a process in the camera body 11 is explained. When the still image capture mode is set after the camera body 11 is turned on by the power operation button 28, the camera controller 60 controls the wireless I/F 63 to send the connection request to the lens unit 12 over the wireless communication (802.11b).

The camera controller 60 judges whether the connection response is received or not. When it is judged that the connection response is not received, the lens controller 60 stays in a standby state until the connection response is received. When it is judged that the connection response is received, the lens controller 60 executes the above described production process of initialization information.

The camera controller 60 sends the command for requesting initialization to the lens unit 12 by the wireless communication (802.11b), based on the produced initialization information. The camera controller 60 confirms completion of the initialization when receiving the signal indicating the completion from the lens unit 12.

The camera controller 60 controls the wireless I/F 63 to send a signal requesting a through image to the lens unit 12. The camera controller 60 controls the serial driver 62 to receive the through image data, and controls the LCD driver 65 to display the through image on the LCD 29.

The camera controller 60 judges whether the shutter button 25 is depressed halfway or not. When it is judged that the shutter button 25 is not depressed halfway, the camera controller 60 stays in a standby state until the shutter button 25 is depressed halfway.

When it is judged that the shutter button 25 is depressed halfway, the camera controller 60 sends the shutter signal S1 to the lens unit 12 through the signal line used only for this purpose. The camera controller 60 judges whether image capture preparation is completed or not. This judgment is made based on whether the signal indicating the completion of the AE/AF processing is obtained from the lens unit 12.

When it is judged that the image capture preparation is not completed, the camera controller 60 stays in a standby state until the preparation is completed. When it is judged that the image capture preparation is completed, the camera controller 60 controls the wireless I/F 63 to send the signal requesting a through image to the lens unit 12.

The camera controller 60 controls the serial driver 62 to receive the through image data, and controls the LCD driver 65 to display the through image on the LCD 29. The camera controller 60 judges whether the shutter button 25 is fully depressed or not. When the shutter button 25 is not fully depressed, the camera controller 60 stays in a standby state until the shutter button 25 is fully depressed.

When it is judged that the shutter button 25 is fully depressed, the camera controller 60 sends the shutter signal S2 to the lens unit 12 through the signal line used only for this purpose. The camera controller 60 judges whether the main image data is received by the serial driver 62 or not. When it is judged that the main image data is not received, the camera controller 60 stays in a standby state until the main image data is received.

When it is judged that the main image data is received by the serial driver 62, the camera controller 60 controls each part of the camera body 11 to apply JPEG compression to the main image data and display it on the LCD 29. Thereafter, the camera controller 60 assigns a file name to the main image data and stores it as the main still image file 85 in the recording medium 72 of the camera body 11.

The camera controller 60 judges whether the storing of the main still image file 85 in the recording medium 72 is completed or not. This judgment is made based on whether the signal indicating the completion of the sending of the main image data is obtained from the lens unit 12.

When it is judged that the storing is not completed, the camera controller 60 stays in a standby state until the storing of the main still image file 85 is completed. When it is judged that the storing is completed, the camera controller 60 judges whether the power of the camera body 11 is turned off or not.

When it is judged that the power of the camera body 11 is not turned off, the camera controller 60 goes back to the process of requesting the through image to the lens unit 12, the process right after the completion of the initialization. When it is judged that the power of the camera body 11 is turned off, the camera controller 60 finishes the process.

As described above, the lens unit 12 and the camera body 11 send and receive the control signals by the wireless communication (802.11b), and transfer the image data from the lens unit 12 to the camera body 11 at high speed by the serial drivers 48 and 62.

In the lens unit 12, image data is obtained by the CCD 16, and YC conversion is applied to the image data. The YC signal is then transferred to the camera body 11 and compressed in JPEG format. In this way, processes are executed separately by the lens unit 12 and the camera body 11, and therefore, heat given off from the IC circuits can be diversified in the digital camera 10.

For the explanation of the image capturing process, the still image capturing process is explained as an example. However, the same process is executed for capturing movies, and therefore the explanation thereof is omitted.

Figure 23:
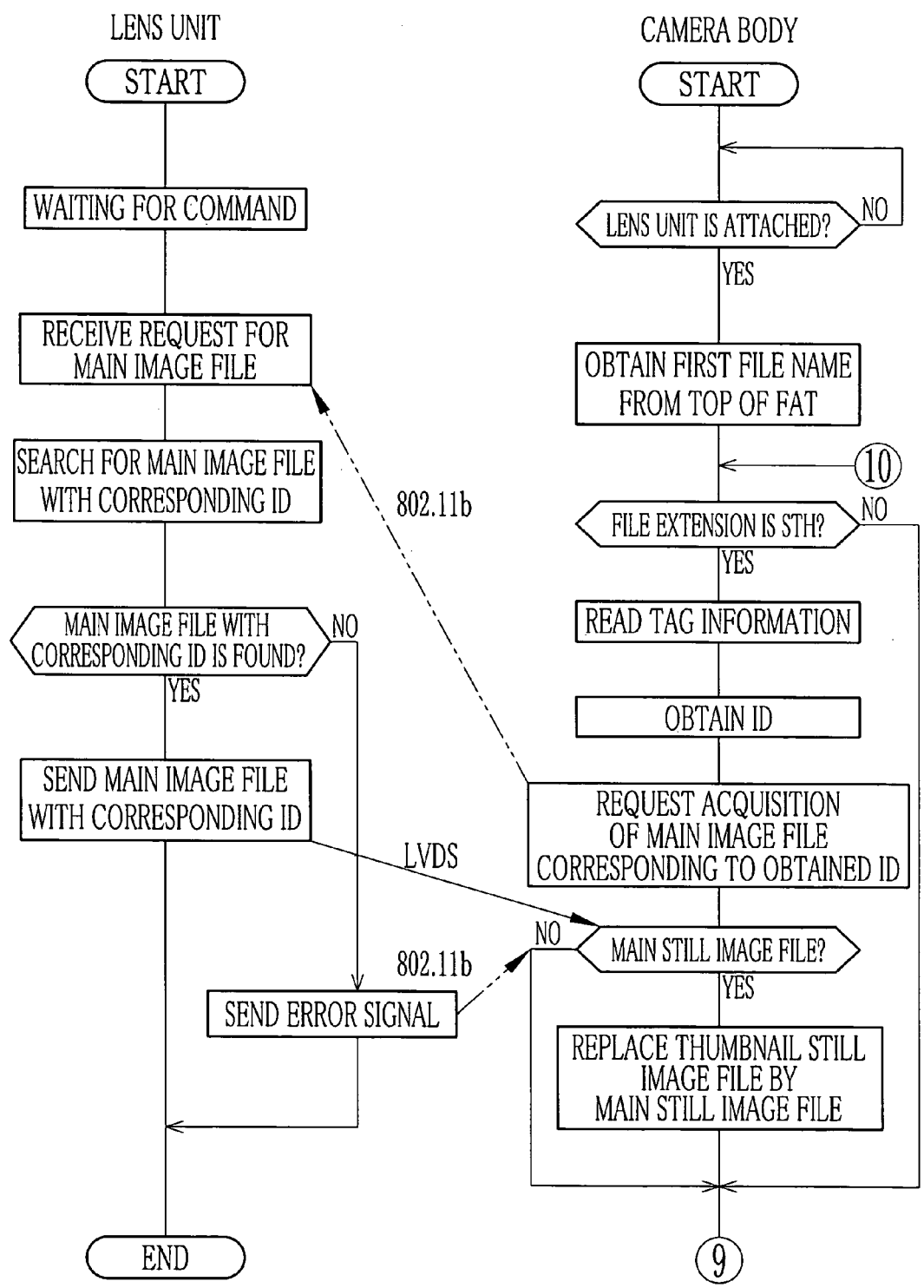
FIG. 23 is a flow chart explaining the synchronization process.
Figure 24:
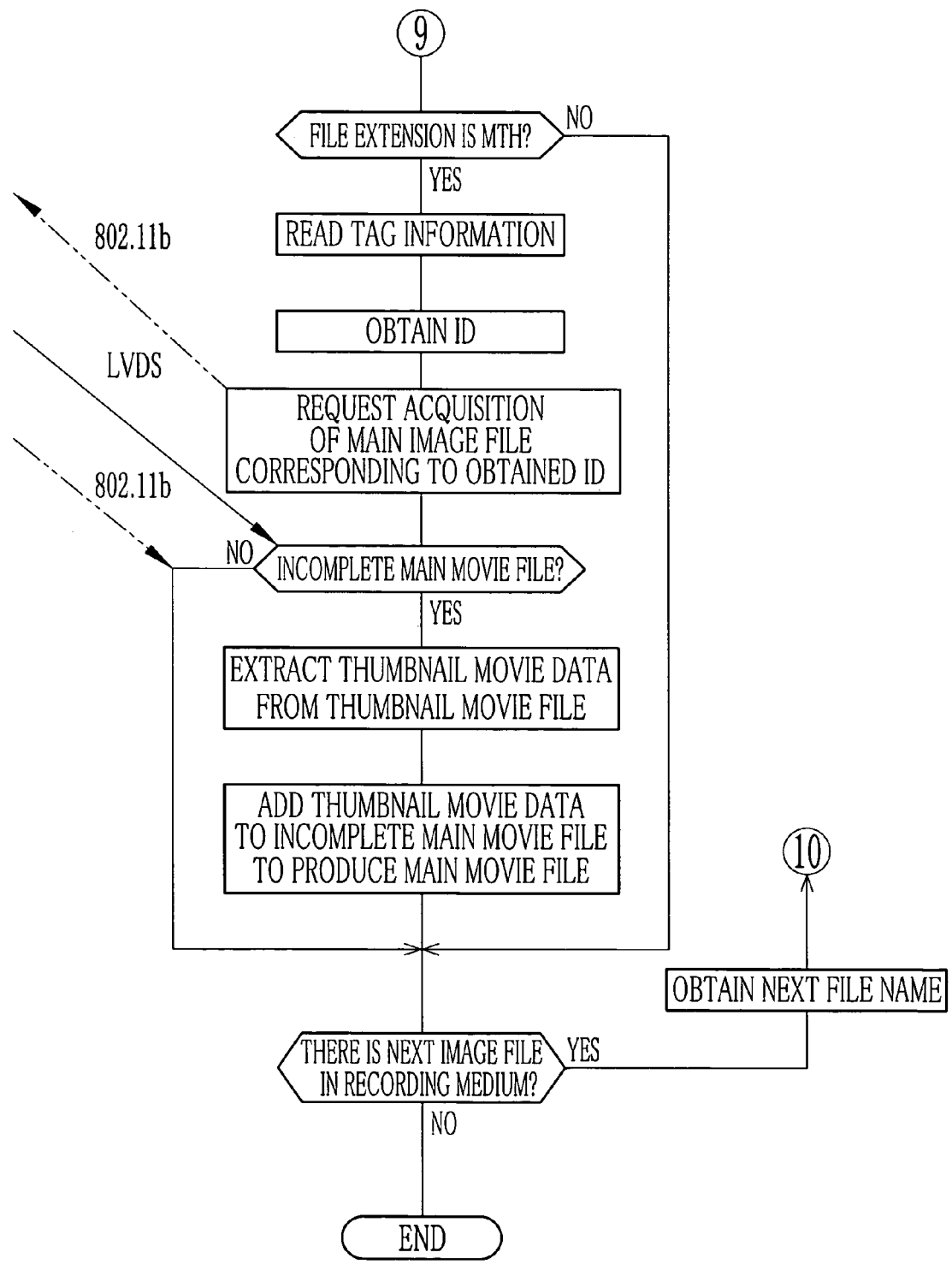
FIG. 24 is the flow chart continued from FIG. 23 explaining the synchronization process.

Next, the synchronization process is explained with referring to a flow chart in FIGS. 23 and 24. First of all, a process in the lens unit 12 is explained. When the lens unit 12 receives a request for a main image file from the camera body 11 while the lens unit 12 is waiting for a command, the lens controller 40 searches for the main image file with corresponding ID.

The lens controller 40 then judges whether the main image file with the corresponding ID is found or not. When it is judged that the main image file with the corresponding ID is found, the lens controller 40 sends this main image file to the camera body 11, and finishes the process.

When it is judged that the main image file with the corresponding ID is not found, the lens controller 40 sends an error signal, indicating that the file does not exist, to the camera body 11, and finishes the process.

Next, a process in the camera body 11 is explained. The camera controller 60 judges whether the lens unit 12 is attached to the camera body 11 or not. When it is judged that the lens unit 12 is not attached, the camera controller 60 stays in a standby state until the lens unit 12 is attached.

When it is judged that the lens unit 12 is attached, the camera controller 60 obtains a first file name from top of a File Allocation Table (FAT). Note that the FAT is a table which manages the storage of the image files in the recording medium 72.

Thereafter, the camera controller 60 judges whether the extension of the image file is "STH" or not. When it is judged that the extension is not "STH", the camera controller 60 moves on to a process of judging whether the extension is "MTH" or not.

When it is judged that the extension is "STH", the camera controller 60 reads Tag information of the image file and obtains the ID given as link information. The camera controller 60 then controls the wireless I/F 63 to send the request for acquisition of the main image file corresponding to the obtained ID to the lens unit 12.

The camera controller 60 judges whether the signal received from the lens unit 12 by the wireless communication carries the main still image file 85 or not. When it is judged that the received signal does not carry the main still image file 85, that is, when it is judged that the error signal is received, the camera controller 60 moves on to the process of judging whether the extension of the image file is "MTH" or not.

When it is judged that the received signal carries the main still image file 85, the camera controller 60 replaces the thumbnail still image file 86 by the main still image file 85. The camera controller 60 then judges whether the extension of the image file is "MTH" or not. When it is judged that the extension is not "MTH", the camera controller 60 moves on to a process of judging whether there is a next image file in the recording medium 72 or not.

When it is judged that the extension is "MTH", the camera controller 60 reads Tag information of the image file and obtains the ID given as link information. The camera controller 60 then controls the wireless I/F 63 to send the request for acquisition of the main image file corresponding to the obtained ID to the lens unit 12.

The camera controller 60 judges whether the signal received from the lens unit 12 by the wireless communication carries the incomplete main movie file 87 or not. When it is judged that the received signal does not carry the main movie file 87, that is, when it is judged that the error signal is received, the camera controller 60 moves on to the process of judging whether there is a next image file in the recording medium 72 or not.

When it is judged that the received signal carries the incomplete main movie file 87, the camera controller 60 adds the thumbnail movie data 88c stored in the thumbnail movie file 88 to the main movie file 87, thereby producing the complete main movie file 89. The camera controller 60 then replaces the thumbnail movie file 88 by the main movie file 89. Owing to this, the complete main movie file 89 can be efficiently produced without producing the thumbnail movie data 88c in the lens unit 12.

The camera controller 60 judges whether there is a next image file in the recording medium 72 or not. When it is judged that there is a next image file, the next file name is obtained. The camera controller 60 then goes back to the process of judging whether the extension of the image file is "STH" or not. When it is judged that there is no next image file in the recording medium 72, the camera controller 60 finishes the synchronization process.

Although the synchronization process is explained to be executed at the time of the attachment of the lens unit 12 to the camera body 11, it is not limited to this. The synchronization process can be executed when the camera body 11 is turned on regardless of whether the image capture mode is set or not.

Figure 25:
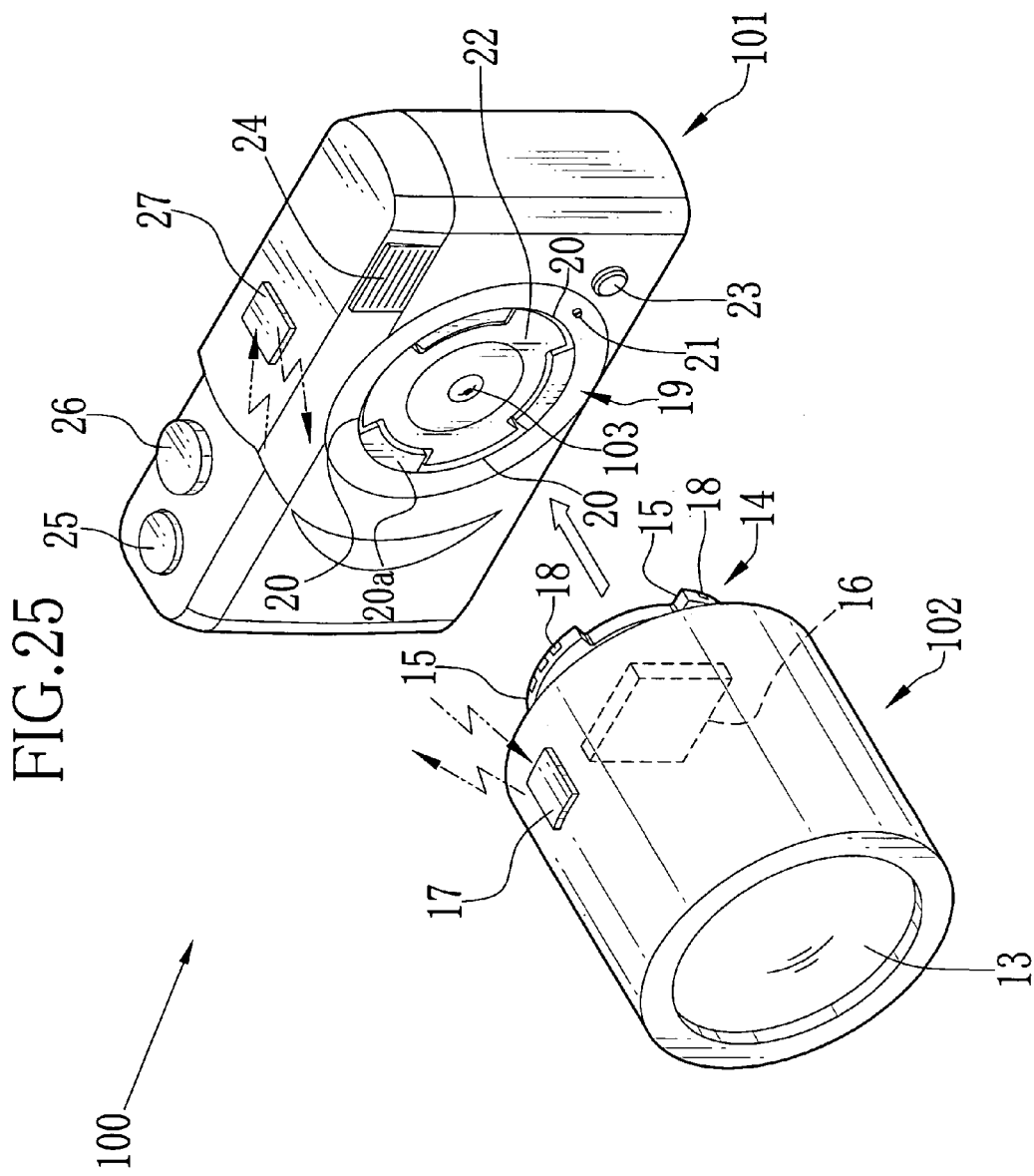
FIG. 25 is a perspective view illustrating a digital camera in which a lens unit is detached from a camera body according to a second embodiment of the present invention.

Next, a digital camera 100 according to a second embodiment is explained. As shown in FIG. 25, the digital camera 100 is composed of a camera body 101 and a lens unit 102. The lens unit 102 is removably attached to the camera body 101. In the digital camera 10, the high-speed serial communication devices which transmit data through the connection contacts are used as one-way communication devices. In the digital camera 100, however, infrared communication devices which are short range optical communication devices are used instead of the high-speed serial communication devices.

Unlike the digital camera 10 according to the first embodiment, a lens 103 is disposed on the front surface of the mount lid 22 of the camera body 101 in the digital camera 100. Behind the lens 103, an infrared light receiving element 104 (see FIG. 26) is disposed. Behind the lens side mount portion 14 of the lens unit 102 are provided an infrared light emitting element 105 (see FIG. 26) and a lens 106 (see FIG. 26). The lens 106 collects the infrared light emitted from the infrared light emitting element 105.

Figure 26:
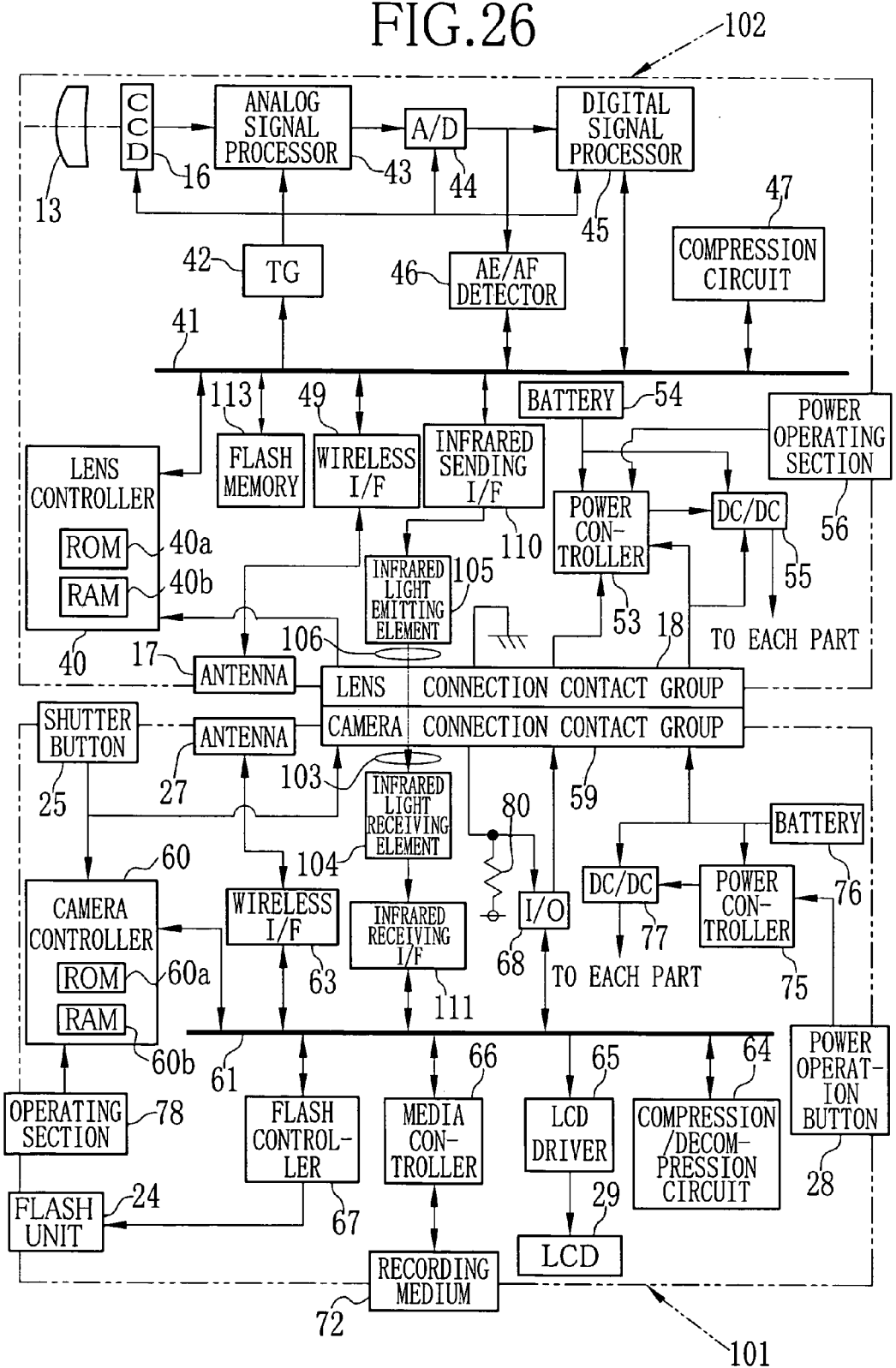
FIG. 26 is a block diagram illustrating an electrical structure of the digital camera according to the second embodiment.

As shown in FIG. 26, the lens unit 102 has an infrared sending I/F 110 instead of the serial driver 48 of the lens unit 12. The infrared sending I/F 110 is connected to the data bus 41.

The infrared light emitting element 105 is connected to the infrared sending I/F 110. The infrared light emitting element 105 emits an infrared laser beam under the control of the infrared sending I/F 110. As the infrared light emitting element 105, for example, a Vertical Cavity Surface Emitting Laser (VCSEL) which is a surface emitting laser is used.

Image data obtained by the CCD 16 is sent on the infrared laser beam from the infrared light emitting element 105 toward the camera body 101 by the infrared sending I/F 110. The lens 106 disposed in front of the infrared light emitting element 105 collects the laser beam, and thus the laser beam is efficiently eradiated toward the camera body 101.

The camera body 101 has an infrared receiving I/F 111 instead of the serial driver 62 of the camera body 11. The infrared I/F 111 is connected to the data bus 61. The infrared light receiving element 104 is connected to the infrared receiving I/F 111. As the infrared light receiving element 104, for example, a GaAs PIN photodiode or the like is used. The lens 103 disposed in front of the infrared light receiving element 104 collects the infrared laser beam.

Unlike the lens unit 12, the lens unit 102 is not provided with the media controller 51, and therefore images cannot be stored in the recording medium 52. Accordingly, the images are stored in a flash memory 113 provided in the lens unit 102. Note that the configuration of the digital camera 100 is identical to the configuration of the digital camera 10 besides the components explained above. Therefore, the components identical to those of the first embodiment are denoted by the same reference numerals, and descriptions thereof are omitted.

In the digital camera 100, when the lens unit 102 is attached to the camera body 101, YC conversion is applied in the lens unit to the image data obtained by the CCD 16, and the image data is sent on the infrared laser beam to the camera body 101 unlike the digital camera 10 which uses the serial drivers.

In the digital camera 100, the synchronization process is performed as in the case of the digital camera 10. In the lens unit 102, however, since the image file is stored in the flash memory 113, it is preferable that the image stored in the flash memory 113 is deleted after the completion of the synchronization process in order to assure capacity for the next shooting. Note that other operations of the digital camera 100 are same as that of the digital camera 10, and therefore descriptions thereof are omitted.

In the above embodiments, the wireless LAN device (802.11b) is used for the wireless communication between the lens unit and the camera body, but the present invention is not limited to this. For example, other standard for the wireless LAN, such as IEEE802.11g or IEEE802.11a may be used, or Bluetooth may be used.

In the above embodiments, the CCD image sensor is used as the solid state imaging device, but the present invention is not limited to this. For example, a CMOS image sensor may be used.

In the above embodiments, the present invention is applied to the digital still camera. However, the present invention is also applicable to digital video cameras. Moreover, the present invention can be applied to TV phones and personal computers with cameras.

Various changes and modifications are possible in the present invention and may be understood to be within the present invention.

What is claimed is:

1. A digital camera including a lens unit having a taking lens and a solid state imaging device and outputting image data, and a camera body to which said lens unit is removably attached and storing said image data, said digital camera comprising:
    a wireless communication device for sending and receiving data between said lens unit and said camera body via radio waves;
    a one-way communication device for communicating data faster than said wireless communication device in one direction from said lens unit to said camera body when said lens unit is attached to said camera body;
    a lens detector for detecting attachment/detachment of said lens unit to/from said camera body; and
    a controller for controlling the data communication, said controller controlling said wireless communication device to send and receive control signals between said lens unit and said camera body via said radio waves while controlling said one-way communication device to send image data obtained with said lens unit to said camera body when the attachment of said lens unit is detected by said lens detector, said controller controlling said wireless communication device to send and receive said control signals between said lens unit and said camera body via said radio waves and to send said image data to said camera body via said radio waves when the detachment of said lens unit is detected by said lens detector.

2. A digital camera as claimed in claim 1, wherein said one-way communication device is a high-speed serial communication device using Low-Voltage Differential Signaling for communicating said data through connection contacts which electrically connect said lens unit and said camera body when said lens unit is attached to said camera body.

3. A digital camera as claimed in claim 1, wherein said one-way communication device is a short range optical communication device.

4. A digital camera as claimed in claim 1, wherein said controller controls said one-way communication device to send main image data with predetermined number of pixels to said camera body and stores said main image data in a first memory in said camera body when an image is captured with said lens unit attached to said camera body, and said controller stores said main image data in a second memory in said lens unit and controls said wireless communication device to send thumbnail image data with lower number of pixels than said main image data to said camera body and stores said thumbnail image data in said first memory when an image is captured with said lens unit detached from said camera body.

5. A digital camera as claimed in claim 4, wherein said lens unit includes a compression device for compressing said image data, and said camera body includes a comparing device for comparing a data rate necessary for sending said main image data to said camera body with an effective data transmission rate of said wireless communication device, said comparing device comparing said data rate with said effective data transmission rate when the detachment of said lens unit is detected by said lens detector, said thumbnail image data compressed by said compression device being sent to said camera body via said radio waves when said data rate is more than said effective data transmission rate, said main image data compressed by said compression device being sent to said camera body via said radio waves when said data rate is equal to or less than said effective data transmission rate.

6. A digital camera as claimed in claim 5, wherein when said data rate is more than said effective data transmission rate, a thumbnail image file including said thumbnail image data and link information to said main image data corresponding to said thumbnail image data is stored in said first memory of said camera body, and a main image file including said main image data and link information to said thumbnail image data corresponding to said main image data is stored in said second memory of said lens unit.

7. A digital camera as claimed in claim 6, wherein said thumbnail image file and said main image file have an identical file name.

8. A digital camera as claimed in claim 7, wherein said camera body has a display device for displaying said main image data and said thumbnail image data on an identical screen.

9. A digital camera as claimed in claim 6, wherein said wireless communication device sends at least one of said file name and a folder name of said thumbnail image file stored in said first memory to said lens unit, and wherein said main image file is assigned with a file name or a folder name derived from said file name or said folder name sent from said first memory.

10. A digital camera as claimed in claim 6, wherein when said lens unit is attached, said controller sends a command requesting said lens unit for said main image file corresponding to said thumbnail image file in a case where said thumbnail image file is stored in said first memory, and replaces said thumbnail image file by said main image file when receiving said main image file corresponding to said thumbnail image file from said lens unit in accordance with said command.

11. A digital camera as claimed in claim 6, wherein when said thumbnail image file stored in said first memory is a thumbnail movie file, thumbnail movie data included in said thumbnail movie file is added to a main movie file stored in said second memory before said thumbnail movie file is replaced by said main movie file.

12. A digital camera as claimed in claim 5, wherein said controller controls said one-way communication device to send through image data obtained with said lens unit to said camera body when the attachment of said lens unit is detected by said lens detector, and said controller controls said compression device to compress said through image data and controls said wireless communication device to send said compressed through image data to said camera body when the detachment of said lens unit is detected by said lens detector.

* * * * *